US011655886B1

(12) United States Patent
Segawa

(10) Patent No.: US 11,655,886 B1
(45) Date of Patent: May 23, 2023

(54) BALL SCREW DEVICE

(71) Applicant: NSK LTD., Tokyo (JP)

(72) Inventor: Ryo Segawa, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/925,512

(22) PCT Filed: Apr. 14, 2022

(86) PCT No.: PCT/JP2022/017820
§ 371 (c)(1),
(2) Date: Nov. 15, 2022

(87) PCT Pub. No.: WO2022/224903
PCT Pub. Date: Oct. 27, 2022

(30) Foreign Application Priority Data

Apr. 21, 2021 (JP) .............................. JP2021-071645

(51) Int. Cl.
*F16H 25/22* (2006.01)
(52) U.S. Cl.
CPC ................................ *F16H 25/2223* (2013.01)
(58) Field of Classification Search
CPC ............. F16H 25/2223; F16H 25/2204; F16H 25/2228; F16H 25/2233; F16H 25/22; F16H 25/20; F16H 25/2015
See application file for complete search history.

(56) References Cited

U.S. PATENT DOCUMENTS

| 2012/0247240 A1* | 10/2012 | Kawahara | F16H 25/20 74/89.23 |
| 2022/0178427 A1* | 6/2022 | De Paula | F16H 25/2015 |

FOREIGN PATENT DOCUMENTS

| DE | 102013208218 A1 * | 11/2014 | ........ F16H 25/2015 |
| JP | 2007-303515 A | 11/2007 | |
| JP | 2012-132557 A | 7/2012 | |
| JP | 2014-145465 A | 8/2014 | |
| JP | 2021-035311 A | 3/2021 | |
| WO | WO-2015040766 A1 * | 3/2015 | ........ F16H 25/2223 |

OTHER PUBLICATIONS

Translation of the International Search Report dated Jun. 21, 2022 in International Application No. PCT/JP2022/017820.
International Search Report for PCT/JP2022/017820 dated Jun. 21, 2022.

* cited by examiner

*Primary Examiner* — Zakaria Elahmadi
(74) *Attorney, Agent, or Firm* — Sughrue Mion, PLLC

(57) ABSTRACT

A ball screw device having a screw shaft rotating during use, a nut moving linearly during use, balls, a fitting cylinder fixed to the nut, a housing, and an anti-rotation member, a first member, which is one of the nut and the fitting cylinder, having a retaining concave portion engaging with a radially inner portion of the anti-rotation member and including a closed surface, an insertion hole of the housing having a guide concave groove engaging with a radially outer portion of the anti-rotation member, the radially inner portion held between the closed surface and an axially end surface a second member, which is the other of the nut and the fitting cylinder, the radially outer portion being able to slide in the guide concave groove.

17 Claims, 19 Drawing Sheets

BALL SCREW DEVICE

This Application is a National Stage of International Application No. PCT/JP2022/017820 filed Apr. 14, 2022, claiming priority based on Japan Patent Application No. 2021-071645 filed Apr. 21, 2021.

TECHNICAL FIELD

The present invention relates to a ball screw device.

BACKGROUND ART

A ball screw device is provided with balls which perform rolling motion between a screw shaft and a nut, and thus has a higher efficiency than a sliding screw device in which a screw shaft is in direct contact with a nut. Therefore, in order to convert rotational motion of a driving source such as an electric motor to linear motion, the ball screw device is assembled in various mechanical devices such as an electric braking device and an automatic manual transmission (AMT) of an automobile, a positioning device of a machine tool, and the like.

The ball screw device includes a screw shaft having a shaft-side ball thread groove having a spiral shape on the outer-circumferential surface, a nut having a nut-side ball thread groove having a spiral shape on the inner-circumferential surface, and balls arranged between the shaft-side ball thread groove and the nut-side ball thread groove. The ball screw device uses either one of the screw shaft or the nut as a rotational motion element and the other of the screw shaft and the nut as a linear motion element, depending on the application.

In the ball screw device, rotation of the linear motion element is blocked in order to prevent the linear motion element from co-rotating with the rotational motion element. FIG. 18 and FIG. 19 illustrate a conventional ball screw device 100 having a structure of preventing rotation of the linear motion element, which is described in JP 2007-303515A.

The ball screw device 100 includes a screw shaft 101, a nut 102, balls 103, a fitting cylinder 104, and a housing 105.

The screw shaft 101 has a shaft-side ball thread groove 106 having a spiral shape on the outer-circumferential surface, and rotates during use. Therefore, the screw shaft 101 is a rotational motion element and is rotatably supported with respect to the housing 105.

The nut 102 has a nut-side ball thread groove 107 having a spiral shape on the inner-circumferential surface, and moves linearly during use. Therefore, the nut 102 is a linear motion element and is prevented from rotating relative to the housing 105 as will be described later.

The screw shaft 101 is inserted inside the nut 102 and arranged coaxially with the nut 102. The shaft-side ball thread groove 106 and the nut-side ball thread groove 107 are arranged so as to face each other in the radial direction, and form a spiral load path 108.

A start point and an end point of the load path 108 are connected by circulation means (not illustrated). The balls 103 that have reached the end point of the load path 108 are returned to the start point of the load path 108 through the circulation means. The start point and the end point of the load path 108 are interchanged depending on the direction of relative displacement in the axial direction of the screw shaft 101 and the nut 102.

The fitting cylinder 104 has a bottomed cylindrical shape and is externally fitted to the nut 102 so as not to rotate relative to the nut 102. The fitting cylinder 104 has an outer diameter larger than the outer diameter of the nut 102. The fitting cylinder 104 has a key groove 109 extending in the axal direction on the outer-circumferential surface.

The housing 105 has an insertion hole 110 through which the nut 102 and the fitting cylinder 104 can be inserted in the axial direction. The insertion hole 110 has a key 111 protruding radially inward on the inner-circumferential surface. The key 111 has a prismatic shape that is elongated in the axial direction, and is fitted into a fitting groove 112 formed on the inner-circumferential surface of the insertion hole 110.

Of the key 111, a portion protruding radially inward from the inner-circumferential surface of the insertion hole 110 is engaged with the key groove 109 provided on the outer-circumferential surface of the fitting cylinder 104 so as to be able to slide in the axial direction. This prevents the nut 102 from rotating relative to the housing 105 and allows the nut 102 to move linearly.

CITATION LIST

Patent Literature

Patent Literature 1: JP 2007-303515A

SUMMARY OF INVENTION

Technical Problem

In the ball screw device 100 having a conventional structure described in JP 2007-303515A, in order to prevent the key 111 from slipping out of the fitting groove 112 in the axial direction, retaining members such as a retaining ring and a screw member are required to be attached to the opening of the insertion hole 110. As a result, the number of parts increases, and this becomes a cause of an increase in manufacturing cost.

On the other hand, JP 2007-303515A also discloses a structure in which the key is integrally formed on the inner-circumferential surface of the housing. However, when the key is formed integrally with the inner-circumferential surface of the housing, it becomes difficult to ensure the shape accuracy of the key. In order to integrally mold the key on the inner-circumferential surface of the housing and ensure the shape accuracy of the key, the manufacturing cost tends to increase. For example, if the key is machined by cutting, the key can be formed integrally with the inner-circumferential surface of the housing and the shape accuracy of the key can be ensured, but the yield deteriorates and the manufacturing cost tends to increase.

The present invention has been made to solve the above problems, and the objective of the present invention is to provide a ball screw device in which a nut, which is a linear motion element, is prevented from rotating with a small number of parts, thereby reducing the manufacturing cost.

Solution to Problem

The ball screw device of a first aspect of the present invention includes a screw shaft, a nut, balls, a fitting cylinder, a housing, and anti-rotation members.

The screw shaft has a shaft-side ball thread groove having a spiral shape on an outer-circumferential surface thereof and rotates during use.

The nut has a nut-side ball thread groove having a spiral shape on an inner-circumferential surface thereof and moves linearly during use.

The balls are arranged between the shaft-side ball thread groove and the nut-side ball thread groove.

The fitting cylinder is fitted and fixed to the nut, and linearly moves together with the nut.

The housing has an insertion hole through which the nut can be inserted in an axial direction.

The anti-rotation members prevent the nut from rotating relative to the housing.

In the ball screw device of the first aspect of the present invention, the first member, which is one of the nut or the fitting cylinder, has a retaining concave portion on an outer-circumferential surface thereof, the retaining concave portion capable of engaging with a radially inner portion of the anti-rotation member in a circumferential direction and including a closed surface facing the axial direction.

The insertion hole has a guide concave groove on an inner-circumferential surface thereof, the guide concave groove capable of engaging with a radially outer portion of the anti-rotation member in the circumferential direction and extending in the axial direction.

The radially inner portion of the anti-rotation member is arranged inside the retaining concave portion with the radially inner portion held between the closed surface and an end surface in the axial direction of the second member, which is the other of the nut and the fitting cylinder, and the radially outer portion of the anti-rotation member is arranged inside the guide concave grooves so as to slide in the axial direction.

In the ball screw device according to a second aspect of the present invention, a dimension in the axial direction of the anti-rotation member defined in the ball screw device of the first aspect can be made smaller than a distance in the axial direction between the closed surface and the second member.

Alternatively, the dimension in the axial direction of the anti-rotation member defined in the ball screw device of the first aspect can be made equal to or larger than the distance in the axial direction between the closed surface and the second member.

In the ball screw device according to a third aspect of the present invention, the first member defined in the ball screw device of the first or second aspect may have a small diameter portion, a large diameter portion having an outer diameter larger than an outer diameter of the small diameter portion, and a stepped surface facing in the axial direction and arranged between the small diameter portion and the large diameter portion on an outer-circumferential surface thereof, and the second member may be externally fitted and fixed to the small diameter portion. In this case, the retaining concave portion is formed in the large diameter portion and is open to the stepped surface.

In the ball screw device according to a fourth aspect of the present invention, the end surface in the axial direction of the second member defined in the ball screw device of the third aspect may be abutted against the stepped surface in the axial direction.

In the ball screw device according to a fifth aspect of the present invention, the second member defined in the ball screw device of the third aspect may have an annular surface facing the axial direction at a position offset in the axial direction from the end surface in the axial direction, and the annular surface may be abutted against an end surface in the axial direction of the first member.

In the ball screw device according to a sixth aspect of the present invention, the first member defined in the ball screw device of any one of the first to fifth aspects can be configured by a nut. That is, the retaining concave portion can be provided on an outer-circumferential surface of the nut.

In the ball screw device according to a seventh aspect of the present invention, the nut defined in the ball screw device of the sixth aspect may have a circulation groove on the inner-circumferential surface, and the retaining concave portion may be arranged at a position (phase) shifted in the circumferential direction from the circulation groove.

In the ball screw device according to an eighth aspect of the present invention, the nut defined in the ball screw device of the seventh aspect may have the circulation groove respectively arranged at portions evenly spaced in the circumferential direction, and the retaining concave portion may be respectively arranged so as to be shifted by the same angle on opposite sides in the circumferential direction with respect to two circulation grooves that are close to each other in the circumferential direction of the circulation grooves arranged at the portions. In other words, the retaining concave portion can be arranged at a center position in the circumferential direction of the two circulation grooves that are adjacent in the circumferential direction.

In the ball screw device according to a ninth aspect of the present invention, a circulation component that may have a circulation groove and is fixed to the nut may be provided in the ball screw device of the sixth aspect, and the retaining concave portion may be arranged in a position shifted in the circumferential direction from the circulation component.

In the ball screw device according to a tenth aspect of the present invention, the circulation component defined in the ball screw device of the ninth aspect may be provided respectively at portions evenly spaced in the circumferential direction, and the retaining concave portion may be respectively arranged so as to be shifted by the same angle on opposite sides in the circumferential direction with respect to two circulation components that are close to each other in the circumferential direction of the circulation components provided at the portions. In other words, the retaining concave portion can be arranged at a center position in the circumferential direction of the two circulation components that are adjacent in the circumferential direction.

In the ball screw device according to an eleventh aspect of the present invention, the first member defined in the ball screw device of any one of the first to fifth aspects may be configured by a fitting cylinder. That is, the retaining concave portion can be provided on an outer-circumferential surface of the fitting cylinder.

In the ball screw device according to a twelfth aspect of the present invention, the fitting cylinder defined in the ball screw device of any one of the first to eleventh aspects may have an outer diameter equal to an outer diameter of the nut.

In the ball screw device according to a thirteenth aspect of the present invention, the anti-rotation members define in the ball screw device of any one of the first to twelfth aspects may have a columnar shape.

In the ball screw device according to a fourteenth aspect of the present invention, the retaining concave portion defined in the ball screw device of the thirteenth aspect may have a cross-sectional shape with respect to a virtual place perpendicular to a center axis of the nut, the cross-section shape having an arc-shape with a center angle greater than 180 degrees.

In the ball screw device according to a fifteenth aspect of the present invention, the anti-rotation member defined in the ball screw device of any one of the first to twelfth aspects may have a prismatic shape. Alternatively, the anti-rotation members defined in the ball screw device of any one of the first to twelfth aspects may have a spherical shape.

In the ball screw device according to a sixteenth aspect of the present invention, the insertion hole defined in the ball screw device of any one of the first to fifteenth aspects may be configured by a cylinder hole, and the fitting cylinder may be configured by a piston.

In the ball screw device according to a seventeenth aspect of the present invention, the second member defined in the ball screw of any one of the first to sixteenth aspects may have a small-diameter stepped portion at an end portion on a side closer to the first member of an outer-circumferential surface thereof.

Advantageous Effect of Invention

According to the ball screw device of the present invention, the anti-rotation of the nut, which is a linear motion element, can be provided with a small number of parts, and the manufacturing cost can be reduced.

DESCRIPTION OF EMBODIMENTS

First Example

Figure 1:
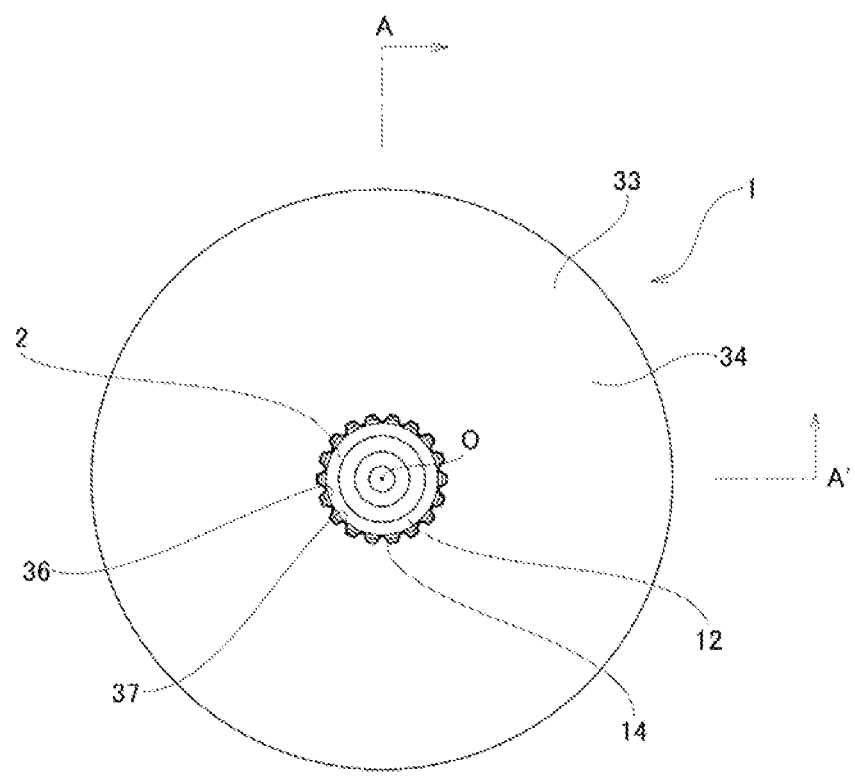
FIG. 1 is a front view of a ball screw device of a first example of an embodiment of the present invention as viewed from one side in the axial direction.

FIGS. 1 to 10 show a first example of an embodiment of the present invention.
[Overall Configuration of Ball Screw Device]
A ball screw device 1 of this example is incorporated in, for example, an electric booster device, and is used for converting rotational motion of an electric motor (not illustrated), which is a driving source, into linear motion of a piston 5, which will be described later.

The ball screw device 1 includes a screw shaft 2, a nut 3 corresponding to a first member, balls 4, a piston 5 corresponding to a fitting cylinder and a second member, and an anti-rotation member 7.

The screw shaft 2 is a rotational motion element that is rotationally driven by a driving source (not illustrated) and rotates during use. The screw shaft 2 is inserted through the inside of the nut 3 and arranged coaxially with the nut 3. The nut 3 is prevented from rotating relative to the housing 6 by the anti-rotation member 7. The nut 3 is a linear motion element that linearly moves inside a cylinder hole 8 provided in the housing 6 together with the piston 5 fitted and fixed to the nut 3. Therefore, the ball screw device 1 of this example is used in an aspect in which the screw shaft 2 is rotationally driven and the nut 3 is linearly moved. In this example, the cylinder hole 8 corresponds to an insertion hole.

A load path 9 having a spiral shape is provided between the outer-circumferential surface of the screw shaft 2 and the inner-circumferential surface of the nut 3. The balls 4 are rollingly arranged in the load path 9. When the screw shaft 2 and the nut 3 are relatively rotated, the balls 4 that have reached the end point of the load path 9 are returned to the start point of the load path 9 through a circulation grooves 10 (see FIG. 7) formed on the inner-circumferential surface of the nut 3. The structures of the components of the ball screw device 1 will be described below.

In the following description, the axial direction, the radial direction, and the circumferential direction mean, unless specified otherwise, the axial direction, the radial direction, and the circumferential direction in relation to the screw shaft. Moreover, one side in the axial direction is referred to as the right side in FIG. 2 to FIG. 4, FIG. 6, FIG. 7, and FIG. 9, and the other side in the axial direction is referred to as the left side in FIG. 2 to FIG. 4, FIG. 6, FIG. 7, and FIG. 9.
[Screw Shaft]
The screw shaft 2 is made of metal, and has a screw portion 11 and a fitting shaft portion 12 adjacently arranged on the one side in the axial direction of the screw portion 11. The screw portion 11 and the fitting shaft portion 12 are coaxially arranged and integrally configured with each other. The fitting shaft portion 12 has an outer diameter smaller than an outer diameter of the screw portion 11.

The screw portion 11 has a shaft-side ball thread groove 13 having a spiral shape on the outer-circumferential surface. The shaft-side ball thread groove 13 is formed by performing a griding process, a cutting process, or a rolling process to the outer-circumferential surface of the screw portion 11. In this example, the number of threads of the shaft-side ball thread groove 13 is one. The groove shape of the shaft-side ball thread groove 13 is a Gothic arch groove or a circular arc groove.

The fitting shaft portion 12 has male spline teeth 14. The male spline teeth 14 are arranged at portions that are evenly spaced in the circumferential direction on the outer-circumferential surface of the fitting shaft portion 12. That is, the fitting shaft portion 12 is a spline shaft portion. In the illustrated example, the male spline teeth 14 are configured by involute spline teeth, but they can also be configured by straight-sided spline teeth.

The screw shaft 2 is arranged coaxially with the nut 3 with the screw portion 11 inserted inside the nut 3. In this example, the screw shaft 2 is configured by the screw portion 11 and the fitting shaft portion 12. However, in a case of implementing the present invention, it is also possible to provide a second fitting shaft portion or the like to the screw shaft for fixing a rolling bearing or the like to be rotatably supported with respect to the housing or the like.

[Nut]

The nut 3 is made of metal such as an iron-based alloy or a stainless-based alloy, and has a cylindrical shape as a whole. The nut 3 has a nut-side ball thread groove 15 having a spiral shape and circulation grooves 10 on the inner-circumferential surface.

The nut-side ball thread groove 15 has a spiral shape. The nut-side ball thread groove 15 is formed by performing, for example, a griding process, a cutting process, a rolling tapping process, or a cutting tapping process to the inner-circumferential surface of the nut 3. The nut-side ball thread groove 15 has the same lead as the shaft-side ball thread groove 13. Therefore, in a state where the screw portion 11 of the screw shaft 2 is inserted through the inside of the nut 3, the shaft-side ball thread groove 13 and the nut-side ball thread groove 15 are arranged so as to face each other in the radial direction to form a spiral load path 9. The number of threads of the nut-side ball thread groove 15 is one, as the same as the shaft-side ball thread groove 13. The groove shape of the nut-side ball thread groove 15 is a Gothic arch groove or a circular arc groove, as with the shaft-side ball thread groove 13.

The circulation groove 10 has a substantially S-shape. The circulation groove 10 is formed on the inner-circumferential surface of the nut 3 by a cold forging process, for example. The circulation groove 10 smoothly connects axially adjacent portions of the nut-side ball thread groove 15 and connects the start point and the end point of the load path 9. Therefore, the balls 4 that have reached the end point of the load path 9 are returned to the start point of the load path 9 through the circulation groove 10. Here, the start point and the end point of the load path 9 are interchanged according to the direction of relative displacement in the axial direction between the screw shaft 2 and the nut 3, in other words, the direction of relative rotation between the screw shaft and the nut 3.

The circulation groove 10 has a semi-circular cross-sectional shape. The circulation groove 10 has a groove width slightly larger than the diameter of the balls 4, and a groove depth that allows the balls 4 moving in the circulation groove 10 to climb over the thread of the shaft-side ball thread groove 13. In this example, four circulation grooves 10 are provided on the inner-circumferential surface of the nut 3 so as to be evenly spaced in the circumferential direction, that is, at equal intervals of 90 degrees. Therefore, the ball screw device 1 of this example includes four circuits. Here, in the ball screw device 1 of this example, although the circulation groove 10 is formed directly on the inner-circumferential surface of the nut 3, it is also possible to form the circulation groove on a separate circulation component, such as a top, and fix the circulation component to the nut.

In this example, the outer-circumferential surface of the nut 3 is configured by a stepped cylindrical surface. The nut 3 has a small diameter portion 16 having a cylindrical surface shape at an end portion on the other side in the axial direction on the outer-circumferential surface, and a large diameter portion 17 in a range extending from the middle section in the axial direction to the one side portion in the axial direction on the outer-circumferential surface. The large diameter portion 17 has an outer diameter slightly smaller than the inner diameter of the cylinder hole 8 provided in the housing 6. The outer-circumferential surface of the nut 3 has an annular stepped surface 18 facing the other side in the axial direction between the small diameter portion 16 and the large diameter portion 17. The stepped surface 18 is a flat surface that exists on a virtual plane perpendicular to the center axis of the nut 3.

The ball screw device 1 of this example uses the nut 3 as a linear motion element. Therefore, in order to prevent rotation of the nut 3, the outer-circumferential surface of the nut 3 has retaining concave portion 19 for retaining the anti-rotation member 7. The retaining concave portion 19 is provided respectively at portions in the circumferential direction on the outer-circumferential surface of the nut 3, at two portions in this example. The retaining concave portion 19 is provided on the other side portion in the axial direction of the large diameter portion 17 on the outer-circumferential surface of the nut 3.

The retaining concave portion 19 is a concave groove extending in the axial direction. The retaining concave portion 19 has a closed surface 20 facing the other side in the axial direction at an end portion on the one side in the axial direction. An end portion on the other side in the axial direction of the retaining concave portions 19 is open to the stepped surface 18. Therefore, the retaining concave portion 19 is open to the outer-circumferential surface of the nut 3 and the stepped surface 18. The center axis of the retaining concave portion 19 is arranged parallel to the center axis of the nut 3. The dimension in the axial direction from the stepped surface 18 to the closed surfaces 20 is slightly larger than the dimension in the axial direction of the anti-rotation member 7. The closed surface 20 is a flat surface that exists on a virtual plane perpendicular to the center axis of the nut 3, and has a partially circular shape (substantially semi-circular shape) when viewed in the axial direction.

Figure 5:
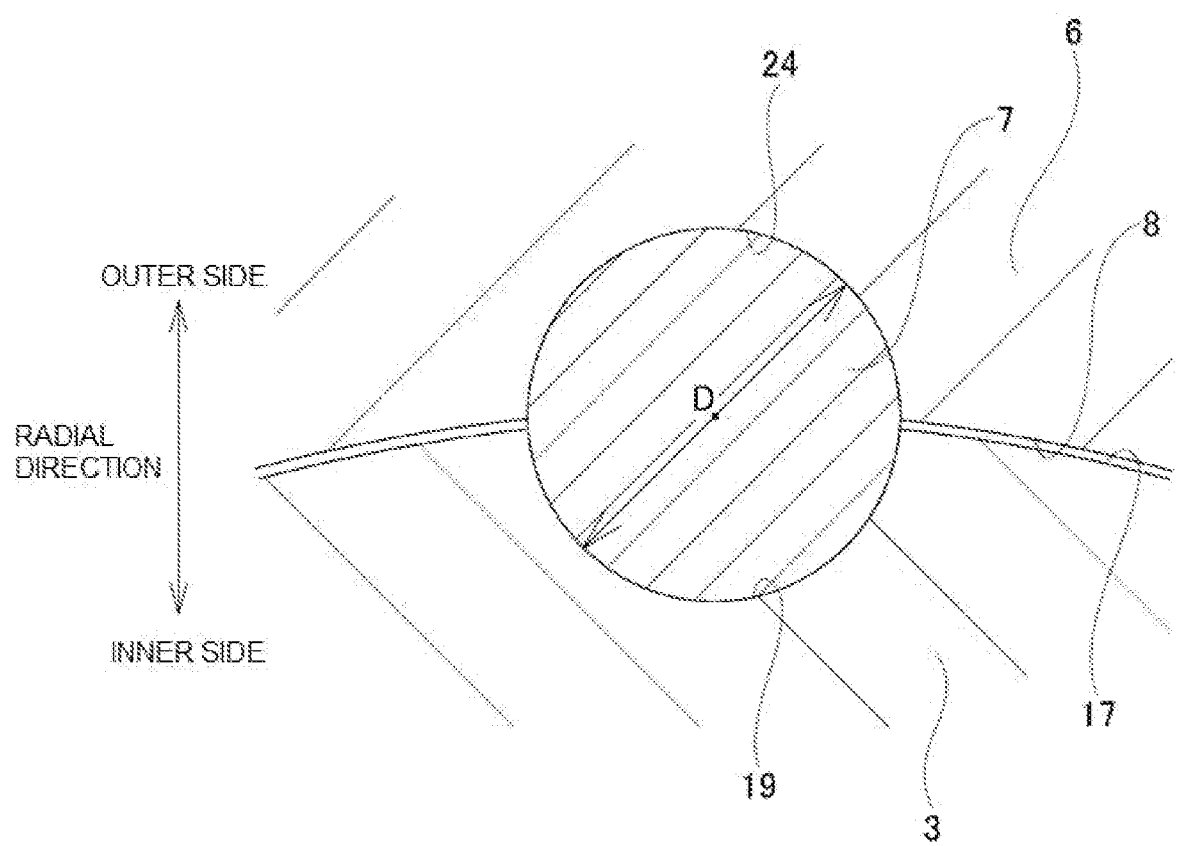
FIG. 5 is a schematic view corresponding to section B-B in FIG. 4.

The retaining concave portion 19 has a cross-sectional shape that can be engaged with the radially inner portion of the anti-rotation member 7 in the circumferential direction. In this example, since the anti-rotation member 7 is configured in a columnar shape, as illustrated in FIG. 5, the cross-sectional shape of the retaining concave portion 19 with respect to the virtual plane perpendicular to the center axis is arc-shaped. Specifically, the cross-sectional shape of the retaining concave portion 19 is a semi-circular arc shape with a center angle of approximately 180 degrees. Therefore, the width in the circumferential direction of the retaining concave portion 19 (horizontal width in FIG. 5) becomes larger toward outside in the radial direction.

The retaining concave portion 19 has a radius of curvature equal to or slightly larger than half the diameter D of the anti-rotation member 7. The opening width of the retaining concave portion 19 on the outer-circumferential surface of the nut 3 in the circumferential direction is substantially the same as the diameter D of the anti-rotation member 7. The diameter of the inscribed circle passing through a portion of the retaining concave portion 19 where the depth in the radial direction is the largest is equal to or larger than the outer diameter of the small diameter portion 16.

The retaining concave portions 19 are arranged on the outer-circumferential surface of the nut 3 so as to be evenly spaced in the circumferential direction. In this example, since two retaining concave portions 19 are provided, the two retaining concave portions 19 are arranged at portions 180 degrees out of phase with each other. The retaining concave portions 19 are respectively arranged with a position (phase) shifted in the circumferential direction from all the circulation grooves 10 provided on the inner-circumferential surface of the nut 3.

Figure 8:
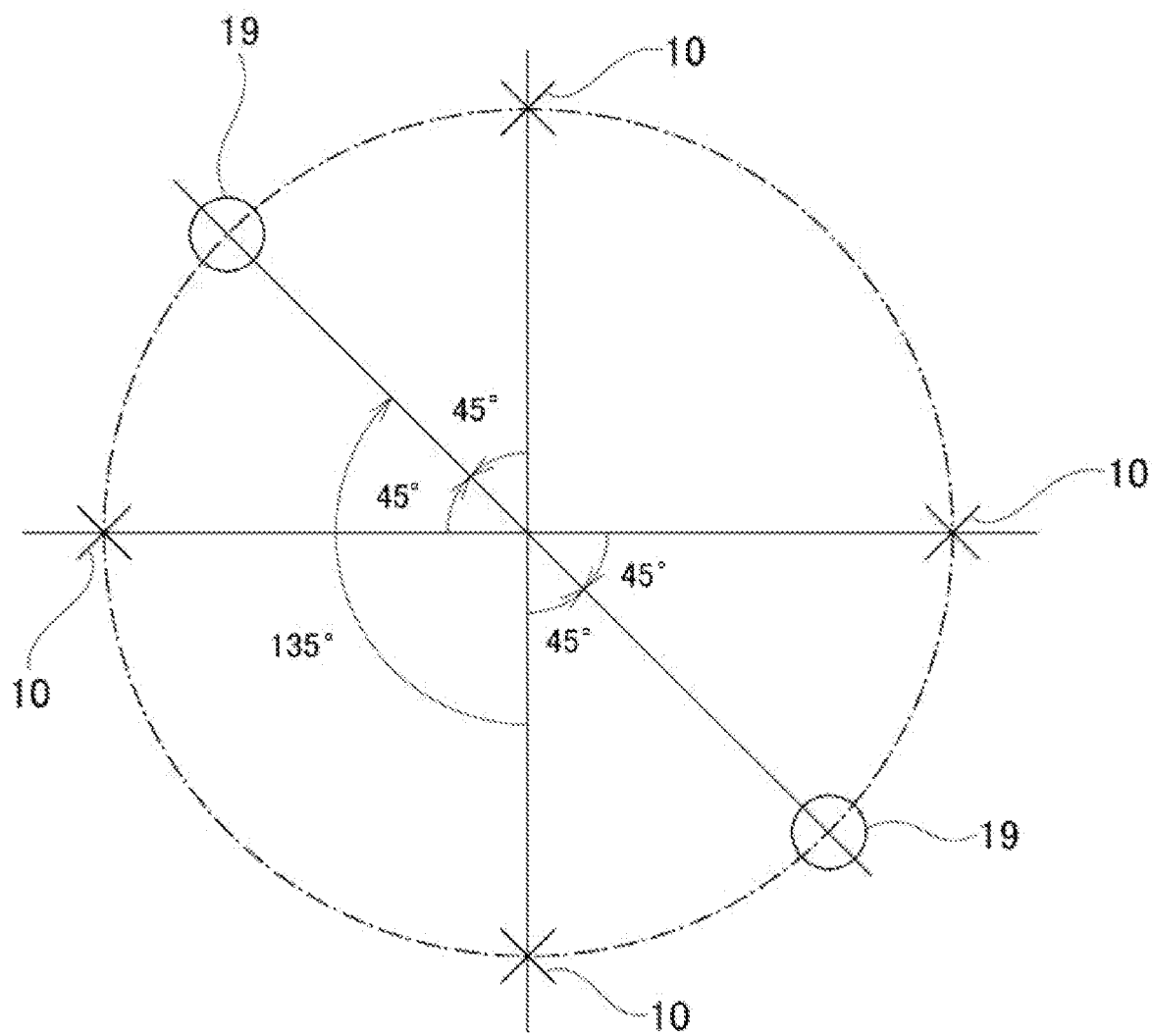
FIG. 8 is a schematic view for explaining the positional relationship in the circumferential direction between a circulation grooves and a retaining concave portion in the ball screw device of the first example.
Figure 9:
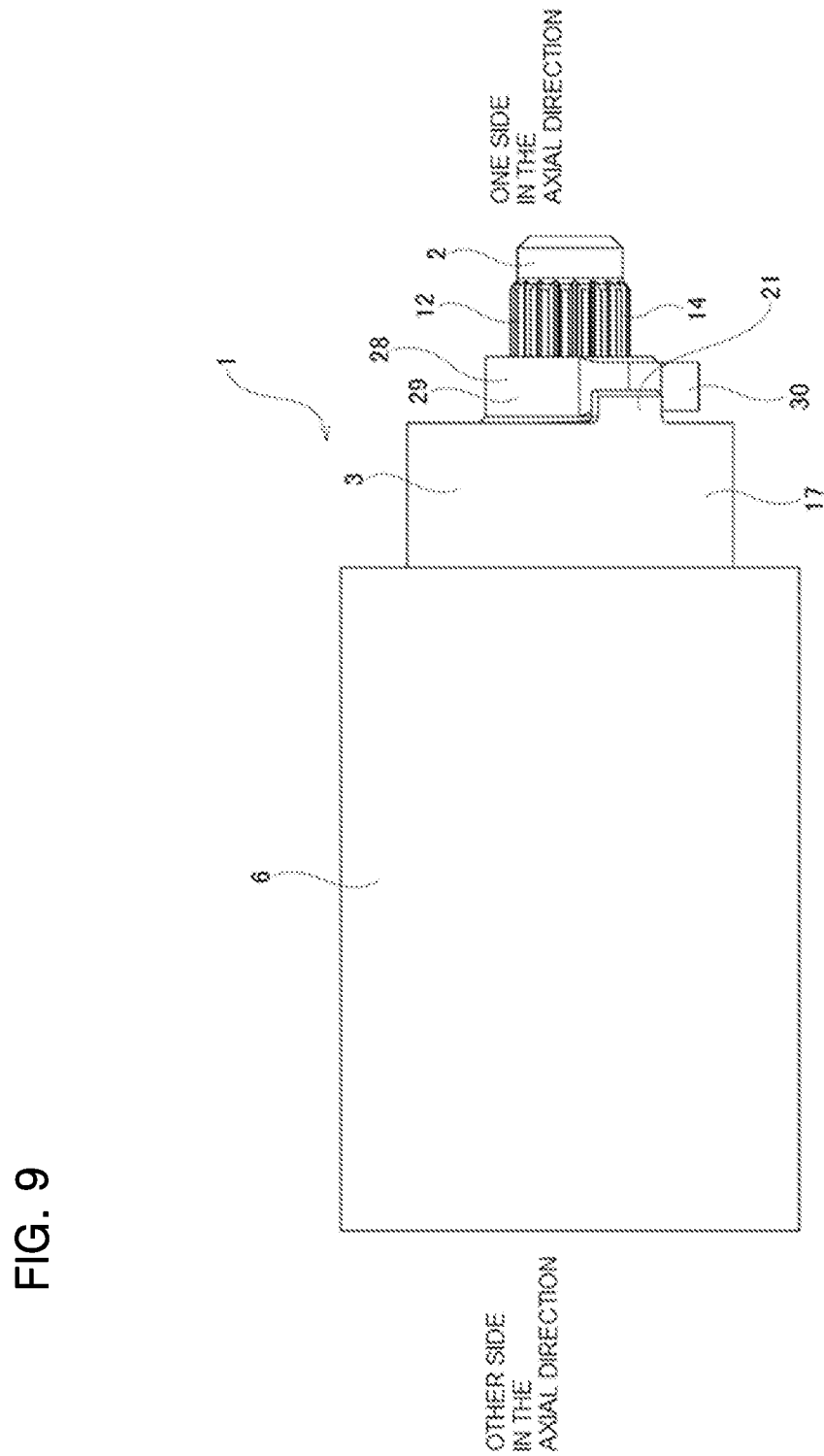
FIG. 9 is a plan view illustrating the ball screw device of the first example with a driving member thereof omitted.
Figure 10:
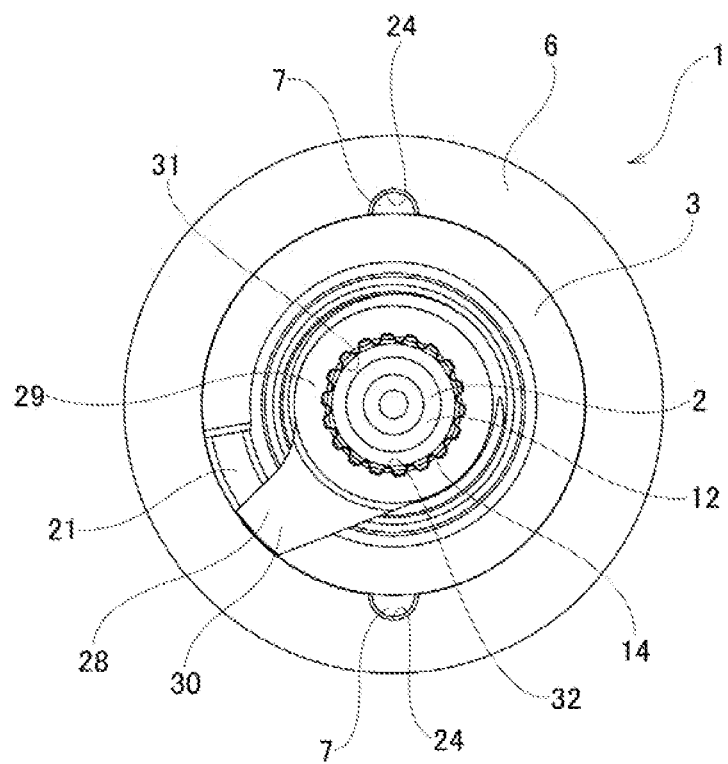
FIG. 10 is a front view of the ball screw device as viewed from the right side in FIG. 9.

Specifically, of the two retaining concave portions 19, one retaining concave portion 19 (lower retaining concave portion 19 in FIG. 7) is arranged in a position shifted by 45 degrees to one side in the circumferential direction from the central portion of one circulation groove 10 which is formed on the same position in the axial direction as the retaining concave portion 19 of the circulation grooves 10 provided on the inner-circumferential surface of the nut 3. Of the two retaining concave portions 19, the other retaining concave portion 19 (upper retaining concave portion 19 in FIG. 7) is arranged in a position shifted by 135 degrees to the other side in the circumferential direction from the central portion of the one circulation groove 10. Therefore, as illustrated in FIG. 8, when the nut 3 is viewed from the axial direction, each of the two retaining concave portions 19 respectively indicated by a circle is arranged in positions shifted by 45 degrees to the opposite side in the circumferential direction with respect to the two circulation grooves 10 indicated by x marks that are close to each other in the circumferential direction. In other words, the one retaining concave portion 19 is arranged at the center position in the circumferential direction of two circulation grooves 10 adjacent to each other in the circumferential direction of the four circulation grooves 10, and the other retaining concave portion 19 is arranged at the center position in the circumferential direction of the remaining two circulation grooves 10. When a configuration is adopted in which a circulation component such as a top having a circulation groove is fixed to the nut, the retaining concave portion can be arranged in a position shifted in the circumferential direction from the circulation component. When the circulation components are provided at portions that are evenly spaced in the circumferential direction, the retaining concave portions can be arranged in positions that are shifted by the same angle to the opposite sides in the circumferential direction with respect to each of the two circulation components that are close to each other in the circumferential direction. In other words, the retaining concave portions can be arranged at the center positions in the circumferential direction between two circulation components that are adjacent to each other in the circumferential direction.

The nut 3 has a first engaging portion 21 at an end portion on the one side in the axial direction. The first engaging portion 21 is provided in a portion in the circumferential direction of a side surface on the one side in the axial direction of the nut 3 and protrudes toward the one side in the axial direction. The first engaging portion 21 has a fan column shape. In the illustrated example, the first engaging portion 21 is provided integrally with the nut 3, however in a case of implementing the present invention, a first engaging portion configured separately from the nut can also be fixed to the nut.

[Balls]

Balls 4 are steel balls each having a predetermined diameter, and are arranged in the load path 9 and the circulation groove 10 so as to be able to roll. The balls 4 arranged in the load path 9 roll while being subjected to a compressive load, whereas the balls 4 arranged in the circulation groove 10 are pushed by the succeeding balls 4 and roll without being subjected to a compressive load.

[Piston]

The piston 5 is made of metal such as an iron-based alloy or an aluminum alloy, and has a bottomed cylindrical shape. The piston 5 is externally fixed to the nut 3 and linearly moves together with the nut 3. The piston 5 is arranged coaxially with the nut 3 and is fitted in the cylinder hole 8 provided in the housing 6 so as to be able to move in the axial direction. The piston 5 has a cylindrical portion 22 and a bottom plate portion 23 closing an end opening on the other side in the axial direction.

The cylindrical portion 22 has an inner diameter slightly smaller than the outer diameter of the small diameter portion 16 of the nut 3. Moreover, the cylindrical portion 22 has the same outer diameter as the outer diameter of the large diameter portion 17 of the nut 3. The outer diameter of the cylindrical portion 22 of the piston 5 and the outer diameter of the large diameter portion 17 of the nut 3 are the "same" does not mean that they are exactly the same, and includes a case that they are substantially the same. Here, "substantially the same" refers to a case where the difference between the outer diameter of the cylindrical portion 22 of the piston 5 and the outer diameter of the large diameter portion 17 of the nut 3 is sufficiently small even if the outer diameter of the cylindrical portion 22 of the piston 5 and the outer diameter of the large diameter portion 17 of the nut 3 are different. Specifically, although not limited to this, it refers to a case where a gap in the radial direction between the inner-circumferential surface of the cylinder hole 8 and the outer-circumferential surface of the cylindrical portion 22 of the piston 5 is 100 μm or less and a gap in the radial direction between the inner-circumferential surface of the cylinder hole 8 and the outer-circumferential surface of the large diameter portion 17 of the nut 3 is 100 μm or less with the inner-circumferential surface of the cylinder hole 8 as a reference.

An end portion on the one side in the axial direction of the cylindrical portion 22 is externally fitted and fixed to the small diameter portion 16 of the nut 3 by press fitting. With the cylindrical portion 22 being externally fitted onto and fixed to the small diameter portion 16, an end surface 5x on the one side in the axial direction of the cylindrical portion 22 abuts against the stepped surface 18 provided on the outer-circumferential surface of the nut 3 in the axial direction. The end surface 5x on the one side in the axial direction of the piston 5 is a flat surface that exists on a virtual plane perpendicular to the center axis of the piston 5.

[Housing]

The housing 6 has a bottomed cylindrical shape, and includes inside a cylinder hole 8 having a circular cross-sectional shape. The center axis of the cylinder hole 8 is arranged coaxially with the center axis of the screw shaft 2. The cylinder hole 8 has an inner diameter capable of inserting the nut 3 and the piston 5 in the axial direction. Specifically, the inner diameter of the cylinder hole is slightly larger than the cylindrical portion 22 of the piston 5 and the large diameter portion 17 of the nut 3. The inner diameter of the cylinder hole 8 is constant along the axial direction at a portion shifted in the circumferential direction from the guide concave groove 24 provided on the inner-circumferential surface.

The cylinder hole 8 has a guide concave groove 24 on the inner-circumferential surface for slidably engaging the anti-rotation member 7 in the axial direction. The guide concave groove 24 extends in the axial direction, and is provided respectively at portions in the circumferential direction on the inner-circumferential surface of the cylinder hole 8, two portions in this example. In this example, the guide concave groove 24 is arranged in a range extending from an end portion on the one side in the axial direction to the middle section in the axial direction of the cylinder hole 8.

The end portion on the one side in the axial direction of the guide concave groove 24 is open to an end surface on the one side in the axial direction of the housing 6. The guide concave groove 24 has a stepped portion 25 facing the one side in the axial direction at an end portion on the other side in the axial direction. Therefore, the guide concave groove 24 is open to the inner-circumferential surface of the cylinder hole 8 and the end surface on the one side in the axial direction of the housing 6. The center axis of the guide concave groove 24 is arranged parallel to the center axis of the cylinder hole 8. The guide concave groove 24 has a dimension in the axial direction which is sufficiently larger than the dimension in the axial direction of the anti-rotation member 7, and can be determined according to a stroke required for the nut 3 and the piston 5.

The guide concave groove 24 has a cross-sectional shape that can be engaged with the radially outer portion of the anti-rotation member 7 in the circumferential direction. In this example, since the anti-rotation member 7 is formed in a columnar shape, as illustrated in FIG. 5, the cross-sectional shape of the guide concave groove 24 with respect to the virtual plane perpendicular to the center axis of the cylinder hole 8 is an arc shape. Specifically, the guide concave groove 24 has a cross-sectional shape having a semi-circular arc shape with a center angle of approximately 180 degrees. Therefore, the width in the circumferential direction of the guide concave groove 24 becomes larger toward inside in the radial direction. The guide concave groove 24 has a radius of curvature slightly larger than half the diameter D of the anti-rotation member 7. The opening width in the circumferential direction of the guide concave groove 24 on the inner-circumferential surface of the cylinder hole 8 is slightly larger than the diameter D of the anti-rotation member 7.

The guide concave grooves 24 are arranged on the inner-circumferential surface of the cylinder hole 8 so as to be evenly spaced in the circumferential direction. In this example, since two guide concave grooves 24 are provided, the two guide concave grooves 24 are arranged at positions 180 degrees out of phase. In the assembled state of the ball screw device 1, the guide concave groove 24 is arranged at the same position as the retaining concave portion 19 in the circumferential direction. Therefore, the guide concave groove 24 and the retaining concave portion 19 are arranged to face each other in the radial direction.

Seal concave grooves 26a, 26b (two in the illustrated example) are provided at portions on the inner-circumferential surface of the cylinder hole 8 that are located on the other side in the axial direction further from the guide concave groove 24. The seal concave grooves 26a, 26b respectively have an annular shape. O-rings 27a, 27b for sealing a gap between the inner-circumferential surface of the cylinder hole 8 and the outer-circumferential surface of the piston 5 are provided in the seal concave grooves 26a, 26b, respectively.

In this example, although the housing 6 is configured in a bottomed cylindrical shape, in a case of implementing the present invention, the shape of the housing can be suitably changed. In this example, the housing 6 is configured to have only the cylinder hole 8 inside, but in a case of implementing the present invention, the inside of the housing can also be provided with a motor accommodating portion for accommodating a motor, a gear accommodating portion for accommodating a gear, and the like in addition to the cylinder hole.

[Anti-Rotation Member]

The anti-rotation member 7 is a member for preventing the nut 3 from rotating with respect to the housing 6, is made of metal such as an iron-based alloy, and has a columnar shape. As the anti-rotation member 7, for example, a roller for a roller bearing or a needle for a needle bearing, which is excellent in quenching and tempering accuracy and has a small surface roughness, can be used.

The anti-rotation member 7 is arranged between the retaining concave portion 19 provided on the outer-circumferential surface of the nut 3 and the guide concave groove 24 provided on the inner-circumferential surface of the cylinder hole 8 so as to be held in the radial direction with a center axis of the anti-rotation member 7 arranged so as to be parallel to the center axis of the cylinder hole 8. In other words, the anti-rotation member 7 is arranged so as to bridge between the retaining concave portion 19 and the guide concave groove 24.

Figure 4:
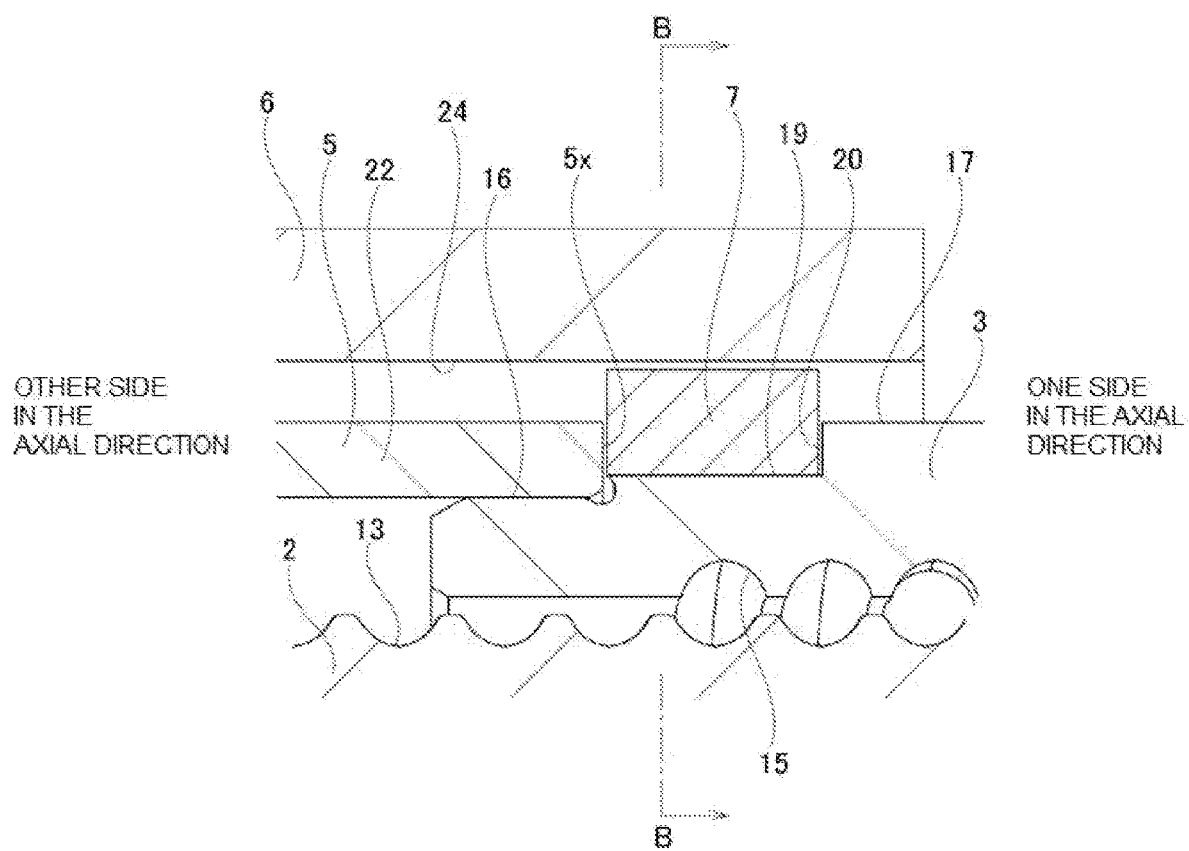
FIG. 4 is a partially enlarged view of FIG. 2.

The radially inner portion (lower portion in FIG. 5) of the anti-rotation member 7 is arranged inside the retaining concave portion 19. As illustrated in FIG. 4, the radially inner portion of the anti-rotation member 7 is held in the axial direction between the closed surface 20 of the retaining concave portion 19 and the surface 5x on the one side in the axial direction of the piston 5. In other words, an end surface on the one side in the axial direction of the anti-rotation member 7 faces the closed surface 20 in the axial direction, and an end surface on the other side in the axial direction of the anti-rotation member 7 faces the end surface 5x on the one side in the axial direction of the piston 5 in the axial direction. Therefore, the anti-rotation member 7 is prevented from coming off in the axial direction by the closed surface 20 and the end surface 5x on the one side in the axial direction of the piston 5. Accordingly, the radially inner portion of the anti-rotation member 7 is arranged inside the retaining concave portion 19 so as not to be able to move in the axial direction.

In this example, the dimension in the axial direction of the anti-rotation member 7 is set slightly smaller than the dimension in the axial direction from the stepped surface 18 of the nut 3 to the closed surfaces 20 of the retaining concave portion 19. Therefore, in a state where the piston 5 is externally fitted and fixed to the nut 3, the dimension in the axial direction of the anti-rotation member 7 is slightly smaller than the distance in the axial direction from the end surface 5x on the one side in the axial direction of the piston 5 abutted against the stepped surface 18 to the closed surface 20. Accordingly, a gap is formed between the end surface on the one side in the axial direction of the anti-rotation member 7 and the closed surface 20, and/or between the end surface on the other side in the axial direction of the anti-rotation member 7 and the end surface 5x on the one side in the axial direction of the piston 5. In other words, the end surfaces on both sides in the axial direction of the anti-rotation member 7 do not simultaneously contact the closed surface 20 and the end surface 5x on the one side in the axial direction of the piston 5, which face each other in the axial direction.

Figure 2:
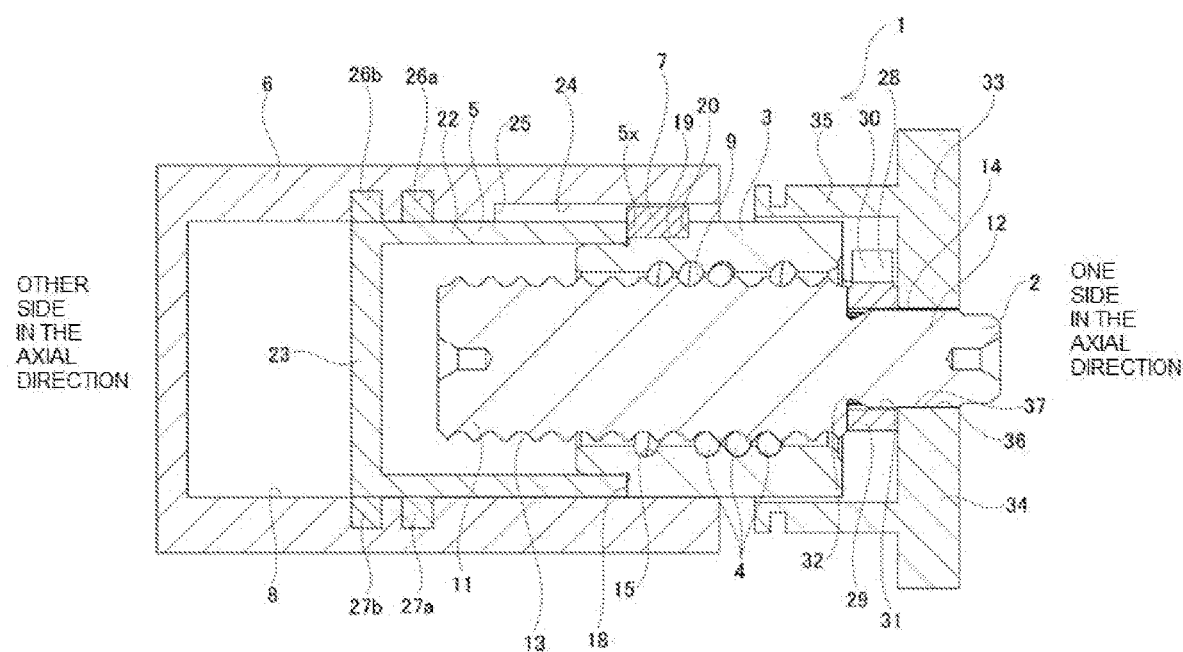
FIG. 2 is a cross-sectional view of section A-O-A' in FIG. 1.
Figure 3:
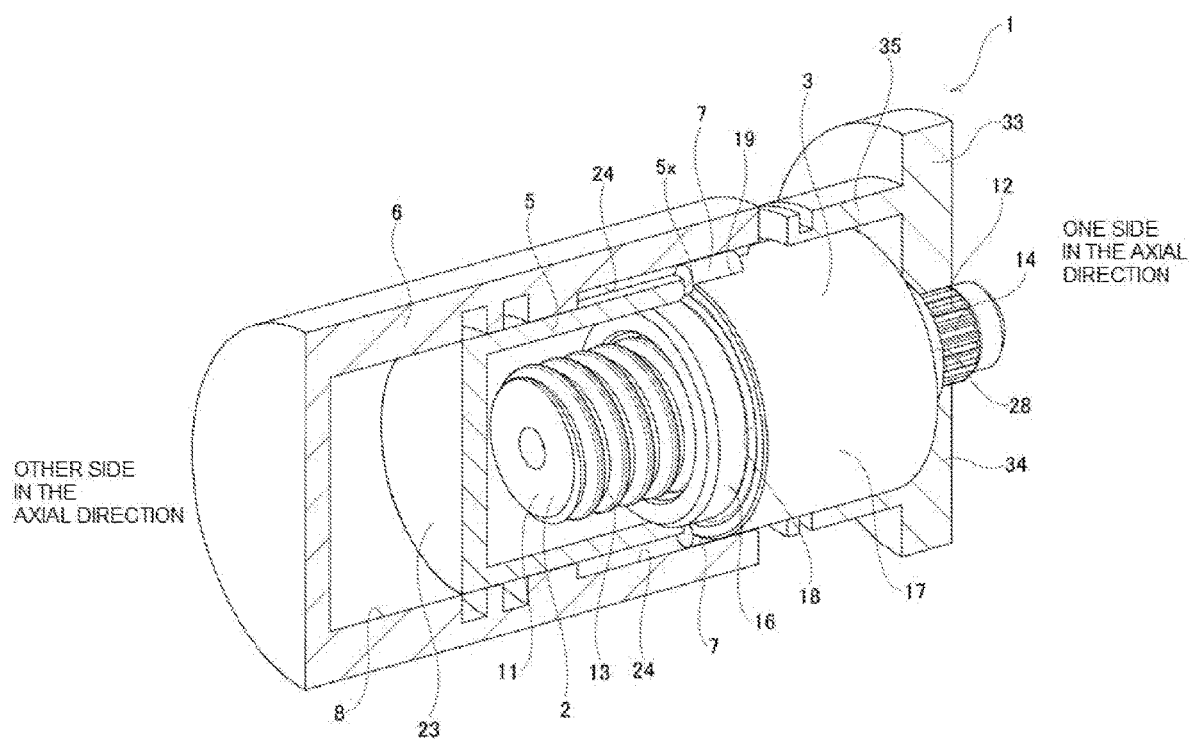
FIG. 3 is a partial perspective view of the ball screw device of the first example.

The radially outer portion of the anti-rotation member 7 (upper side portion in FIG. 5) is arranged inside the guide concave groove 24. As illustrated in FIG. 2, since the dimension in the axial direction of the guide concave groove 24 is set sufficiently larger than the dimension in the axial direction of the anti-rotation member 7, the radially outer portion of the anti-rotation member 7 is arranged inside the guide concave groove 24 so as to be able to slide in the axial direction.

Figure 6:
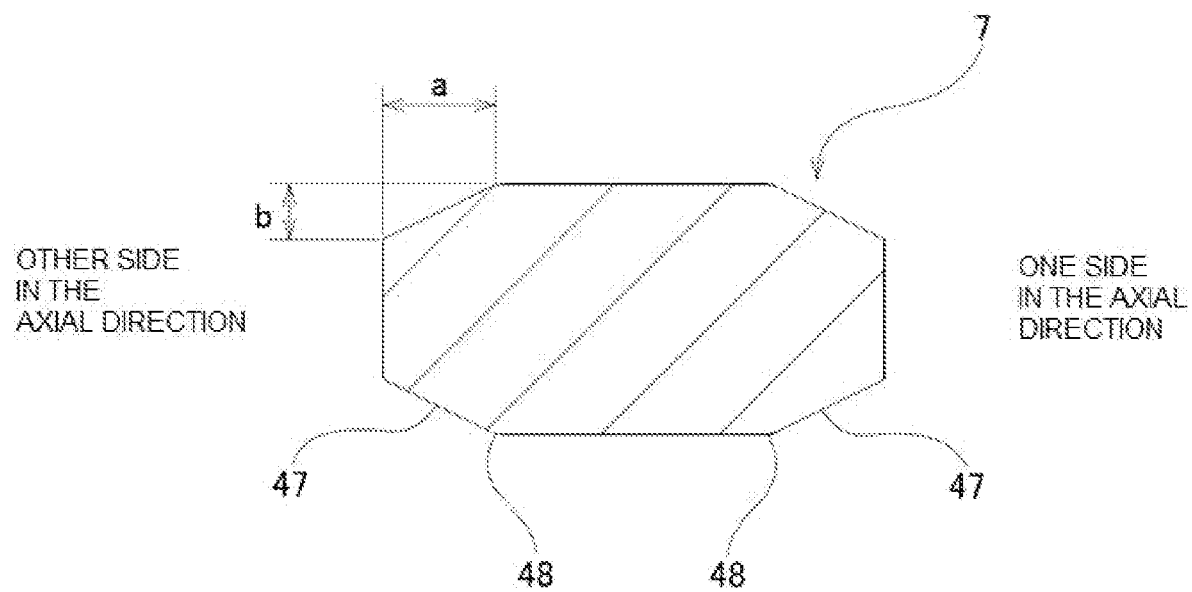
FIG. 6 is a schematic cross-sectional view illustrating an anti-rotation member taken out from the ball screw device of the first example.
Figure 7:
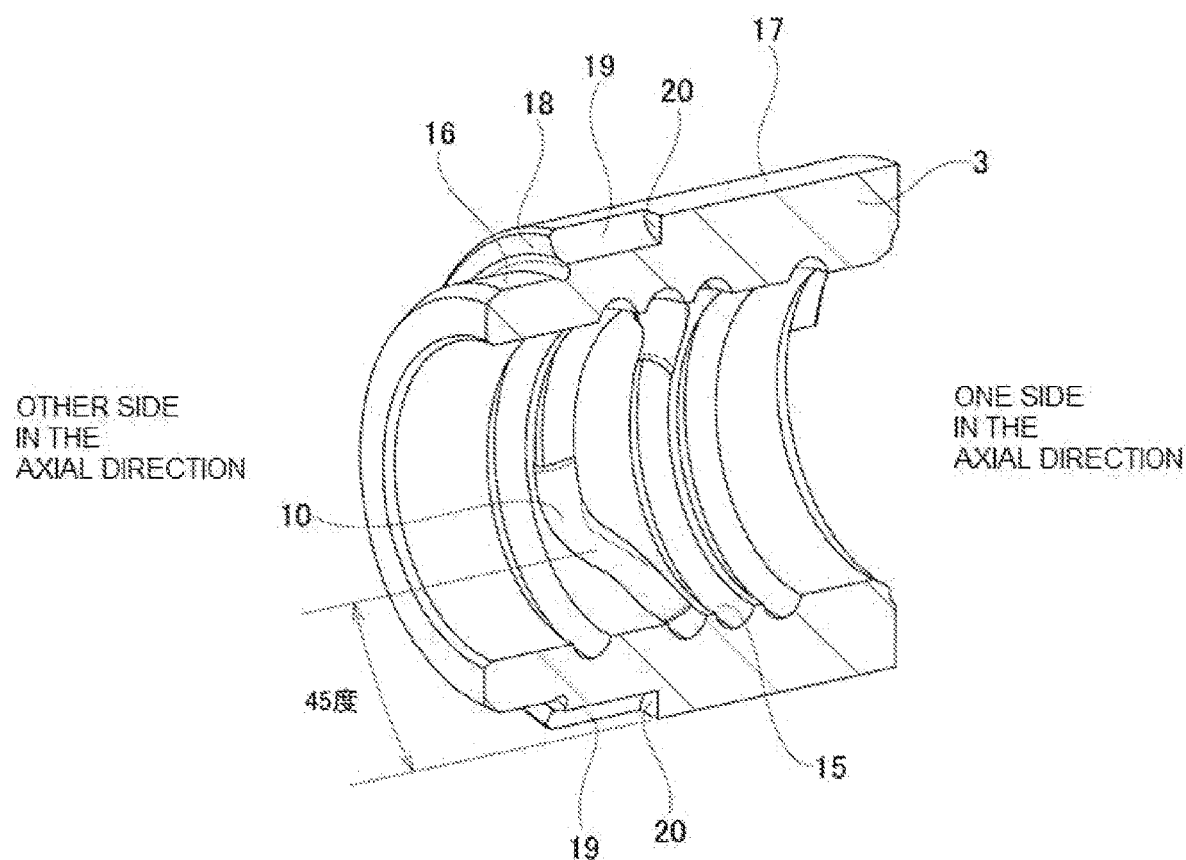
FIG. 7 is a perspective view illustrating a nut taken out from the ball screw device of the first example.

In this example, as illustrated in FIG. 6, a tapered chamfer portion 47 is formed respectively at end portions on both sides in the axial direction on the outer-circumferential surface of the anti-rotation member 7 in order to improve the slidability between the anti-rotation member 7 and the guide concave groove 24. The chamfer portions 47 are omitted in Figures other than FIG. 6. Moreover, the chamfer portions 47 and the cylindrical outer-circumferential surface provided in the middle section in the axial direction of the anti-rotation member 7 are smoothly connected by continuous portions 48 each having an arc-shaped cross-sectional shape. Furthermore, in this example, in order to secure engaging allowance in the radial direction between the end surface on the one side in the axial direction of the anti-rotation member 7 and the closed surface 20 of the nut 3, the dimension b in the radial direction of each of the chamfer portions 47 is adjusted to be equal to or less than the dimension a in the axial direction of each of the chamfer portions 47 (b≤a).

When assembling the ball screw device 1, anti-rotation member 7 coated with grease is arranged inside the retaining concave portion 19, and the anti-rotation member 7 is prevented from coming off the retaining concave portion 19 by attaching the anti-rotation member 7 to the retaining concave portion 19. Alternatively or additionally, it is also possible to prevent the anti-rotation member 7 from coming off by arranging a guide cylinder so as to cover the periphery of the anti-rotation member 7 arranged inside the retaining concave portion 19.

The ball screw device 1 of this example further includes a stopper 28 for regulating the stroke end of the nut 3 and a driving member 33 for rotationally driving the screw shaft 2.

[Stopper]

The stopper 28 has a boss portion 29 having an annular shape and a second engaging portion 30 having a projection shape.

The boss portion 29 is externally fitted to the fitting shaft portion 12 of the screw shaft 2 so as not to be able to relatively rotate. The boss portion 29 has an engaging hole 31 in the central portion in the radial direction, through which the fitting shaft portion 12 can be inserted in the axial direction. In this example, the engaging hole 31 has female spline teeth 32 on the inner-circumferential surface. The female spline teeth 32 are arranged at portions evenly spaced in the circumferential direction on the inner-circumferential surface of the engaging hole 31. That is, the engaging hole 31 is configured by a spline hole. The boss portion 29 is externally fitted to the fitting shaft portion 12 so as not to be able to relatively rotate with respect to the fitting shaft portion 12 by spline-engaging the fitting shaft portion 12 with the engaging hole 31. The thickness in the axial direction of the boss portion 29 is sufficiently smaller than the dimension in the axial direction of the fitting shaft portion 12.

The boss portion 29 has an outer-circumferential surface having a cylindrical surface shape.

The second engaging portion 30 is provided on a portion in the circumferential direction on the outer-circumferential surface of the boss portion 29 and protrudes outward in the radial direction.

[Driving Member]

The driving member 33 is a member such as a gear or a pulley, and rotates and drives the screw shaft 2 by transmitting torque input from a driving source such as an electric motor to the screw shaft 2. The driving member 33 is arranged adjacent to the one side in the axial direction of the stopper 28.

The driving member 33 has a base plate portion 34 and a cylindrical tubular portion 35.

The base plate portion 34 has a mounting hole 36 that penetrates in the axial direction at its central portion in the radial direction. The mounting hole 36 has a plurality of female spline teeth 37 on the inner-circumferential surface. The female spline teeth 37 are arranged at portions evenly spaced in the circumferential direction on the inner-circumferential surface of the mounting hole 36. That is, the mounting hole 36 is configured by a spline hole. The base plate portion 34 is externally fitted onto the fitting shaft portion 12 so as not to be able to relatively rotate with respect to the fitting shaft portion 12 by spline-engaging a portion of the fitting shaft portion 12, which is shifted to the one side in the axial direction from the portion where the stopper 28 is externally fitted, with the mounting hole 36.

The tubular portion 35 extends in the axial direction from a portion on the outer side in the radial direction of a side surface on the other side in the axial direction of the base plate portion 34. The tubular portion 35 has an inner diameter slightly larger than the outer diameter of the nut 3. The tubular portion 35 covers the surrounding portion of the stopper 28 and the end portion on the one side in the axial direction of the screw portion 11.

A gear portion may be formed on the outer-circumferential surface of the base plate portion 34 or the tubular portion 35, or a belt may be stretched thereon. As the driving member 33, a sprocket, a motor shaft, or the like can be adopted in addition to a gear or a pulley.

[Explanation of Operation of Ball Screw Device]

In the ball screw device 1 of this example, when the screw shaft 2 is rotated and driven by a driving source (not illustrated) through the driving member 33, the nut 3 which is prevented from rotating relative to the housing by the anti-rotation members 7 linearly moves inside the cylinder hole 8 together with the piston 5. As a result, the liquid or gas filled in the cylinder hole 8 is discharged or sucked through a communication hole (not illustrated) provided in the housing 6. When the nut 3 and the piston 5 move linearly, the anti-rotation member 7 is pressed in the axial direction by the closed surface 20 of the retaining concave portion 19 or the end surface 5x on the one side in the axial direction of the piston 5 so as to linearly move together with the nut 3 and the piston 5.

When the nut 3 relatively moves to the one side in the axial direction with respect to the screw shaft 2 and reaches the stroke end, the first engaging portion 21 provided on the nut 3 and the second engaging portion 30 provided on the stopper 28 engage in the circumferential direction. As a result, rotation of the screw shaft 2 is prevented. Thus, the ball screw device 1 of this example can restrict the stroke end related to the relative movement of the nut 3 to the one side in the axial direction with respect to the screw shaft 2. The stroke end related to the relative movement of the nut 3 to the other side in the axal direction with respect to the screw shaft 2 can be regulated by abutting the end surface on the other side in the axial direction of the anti-rotation member 7 against the stepped portion 25, which is a closed end of the guide concave grooves 24, alternatively, it can also be regulated using various conventionally known stroke limiting mechanisms.

According to the ball screw device 1 of this example as described above, the anti-rotation of the nut 3, which is a linear motion element, can be achieved with a small number of parts, and the manufacturing cost can be reduced.

That is, in this example, the anti-rotation member 7 is prevented from coming off in the axial direction by holding the radially inner portion of the anti-rotation member 7 for preventing relative rotation of the nut 3 with respect to the housing 6, which is arranged on the inside of the retaining concave portion 19, in the axal direction between the closed surface 20 of the retaining concave portion 19 and the end surface 5x on the one side in the axial direction of the piston 5. Therefore, in the ball screw device 1 of this example, it is possible to omit retaining members such as a retaining ring and a screw member that were required in the conventional structure described in JP 2007-303515A. In this example, since the anti-rotation member 7 which is separate from the nut 3 and the housing 3 is used, the manufacturing cost can be sufficiently suppressed compared to the case where the key is integrally formed on the inner-circumferential surface of the housing. The shape accuracy of the anti-rotation member 7 can be improved at low cost. Accordingly, according to the ball screw device 1 of this example, the anti-rotation of the nut 3 can be achieved with a small number of parts, and the manufacturing cost can be reduced.

In this example, the dimension in the axial direction of the anti-rotation member 7 is made slightly smaller than the distance in the axial direction from the end surface 5x on the one side in the axial direction of the piston 5 which is abutted against the stepped surface 18 of the nut 3 to the closed surface 20 of the retaining concave portion 19 so as to form a gap between the end surface on the one side in the axial direction of the anti-rotation member 7 and the closed surface 20, and/or the end surface on the other side in the axial direction of the anti-rotation member 7 and the end surface 5x on the one side in the axial direction of the piston 5. Therefore, axial force transmitted between the nut 3 and the piston 5 can be prevented from being transmitted through the anti-rotation member 7. In this example, the axial force can be transmitted through the abutting portion between the end surface 5x on the one side in the axial direction of the piston 5 and the stepped surface 18 of the nut 3. Accordingly, it becomes easier to ensure coaxiality between the nut 3 and the piston 5, and prevents the anti-rotation member 7 from being deformed.

Each of the retaining concave portions 19 is arranged at positions shifted in the circumferential direction from all the circulation grooves 10 provided on the inner-circumferential surface of the nut 3. Specifically, when the nut 3 is viewed from the axial direction, each of the two retaining concave portions 19 is arranged so as to be shifted by the same angle (45 degrees in this example) on opposite sides in the circumferential direction from the two circulation grooves 10 arranged closer to each other in the circumferential direction. Therefore, the decrease in the strength of the nut 3 due to the formation of the retaining concave portion 19 can be suppressed. Accordingly, the outer diameter of the nut 3 does not have to be unnecessarily increased, and the ball screw device 1 can be prevented from becoming large.

In this example, since the radius of curvature of the guide concave groove 24 is made slightly larger than half the diameter D of the anti-rotation member 7, the guide concave groove 24 and the anti-rotation member 7 can be brought into line contact. Therefore, it is possible to improve slidability of the anti-rotation member 7 and the guide concave groove 24. Furthermore, in this example, since the chamfer portions 47 are formed at the end portions in the axial direction on the outer-circumferential surface of the anti-rotation member 7 as well, the sliding resistance between the anti-rotation member 7 and the guide concave groove 24 can be reduced, and the slidability between the anti-rotation member 7 and the guide concave groove 24 can be improved.

Figure 18:
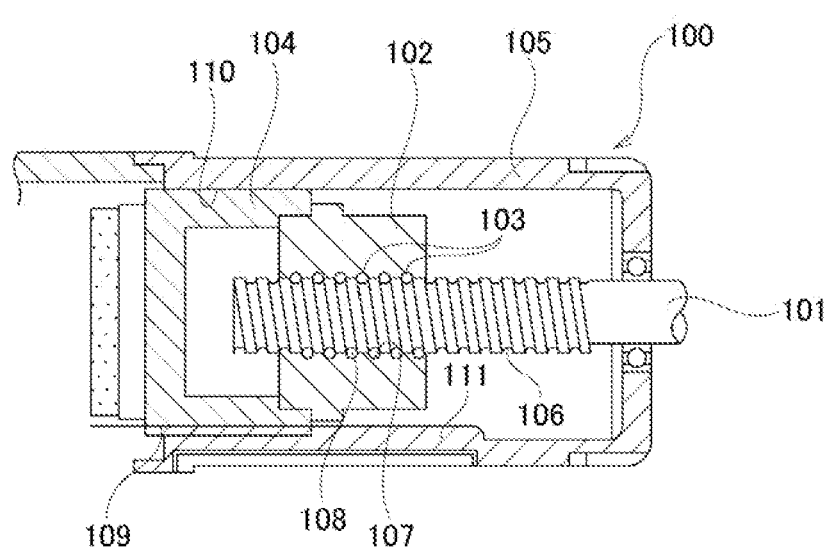
FIG. 18 is a cross-sectional view illustrating a ball screw device having a conventional structure.
Figure 19:
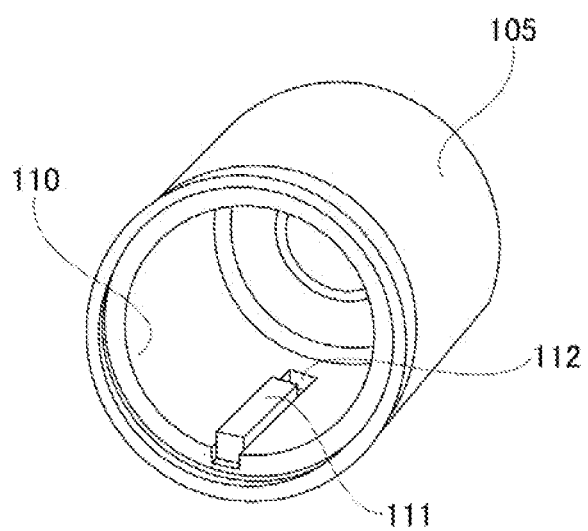
FIG. 19 is a perspective view illustrating a housing taken out from the ball screw device having the conventional structure.

In this example, the ball screw device 1 can also be more compact. In the ball screw device 100 having a conventional structure described in JP 2007-303515A, as illustrated in FIG. 18, the outer diameter of the fitting cylinder (piston) 104 externally fitted to the nut 102 is larger than the outer diameter of the nut 102. As a result, the diameter of the insertion hole 110 of the housing 105 becomes large, which causes a problem that the size of the ball screw device 100 tends to be large. A ball screw device is used by being incorporated in, for example, an electric braking device (EMB) for automobiles. However, since the electric braking device needs to be installed in a limited space such as a tire house, there is a high demand for miniaturization. Accordingly, the ball screw device is also required to be miniaturized.

In the ball screw device 1 of this example, the problem of miniaturization as described above is solved by making the outer diameter of the large diameter portion 17 of the nut 3 and the outer diameter of the cylindrical portion 22 of the piston 5 the same. In order to solve the problem of miniaturizing the ball screw device, the anti-rotation means is not particularly limited as long as the nut or the fitting cylinder (piston) is prevented from rotating relative to the housing.

Further, in this example, by making the outer diameter of the large diameter portion 17 of the nut 3 and the outer diameter of the cylindrical portion 22 of the piston 5 the same, in addition to miniaturization of the ball screw device 1, the following effects can also be obtained.

First, by making the outer diameter of the large diameter portion 17 of the nut 3 and the outer diameter of the cylindrical portion 22 of the piston 5 the same, two parts, which are the piston 5 and the nut 3 arranged around the screw portion 11 of the screw shaft 2, are integrally configured to linearly move inside one cylinder hole 8. That is, since the nut 3 can be regarded as a part of the piston 5, it is possible to suppress rattling and tilting of the piston 5 with respect the cylinder hole 8 in the same manner as when the dimension in the axial direction of the piston 5 is increased.

Second, by making the outer diameter of the large diameter portion 17 of the nut 3 and the outer diameter of the cylindrical portion 22 of the piston 5 the same, it is possible to maximize the size of the nut 3 with respect to the inner diameter of the cylinder hole 8 into which the piston 5 can be inserted. Therefore, according to the ball screw device 1 of this example, the load capacity can be increased, the high load can be endured, and the life can be extended.

Third, since the outer diameter of the large diameter portion 17 of the nut 3 can be made close to the inner diameter of the cylinder hole 8, the gap between the outer-circumferential surface of the large diameter portion 17 and the inner-circumferential surface of the cylinder hole 8 can be reduced. As a result, the inclination of the nut 3 can be suppressed by the inner-circumferential surface of the cylinder hole 8. Accordingly, it is possible to prevent the screw shaft 2 and the nut 3 from being tilted relative to each other, and to prevent uneven load from being applied to the balls 4 rolling on the load path 9.

Fourth, since the gap between the outer-circumferential surface of the large diameter portion 17 and the inner-circumferential surface of the cylinder hole 8 can be made small, it is possible to secure an engaging allowance in the radial direction between the anti-rotation member 7 and the retaining concave portion 19. Accordingly, the anti-rotation member 7 can be effectively prevented from coming off the retaining concave portion 19.

Fifth, by making the outer diameter of the large diameter portion 17 of the nut 3 and the outer diameter of the cylindrical portion 22 of the piston 5 the same, the inner diameter of the cylinder hole 8 can be made constant (the same diameter) over the axial direction at the portion shifted in the circumferential direction from the guide concave grooves 24. As a result, it becomes possible to perform a cutting process for machining the cylinder hole 8 in the housing 6 in one pass. Accordingly, the number of processes can be reduced, and the manufacturing cost can be reduced.

Second Example

Figure 11:
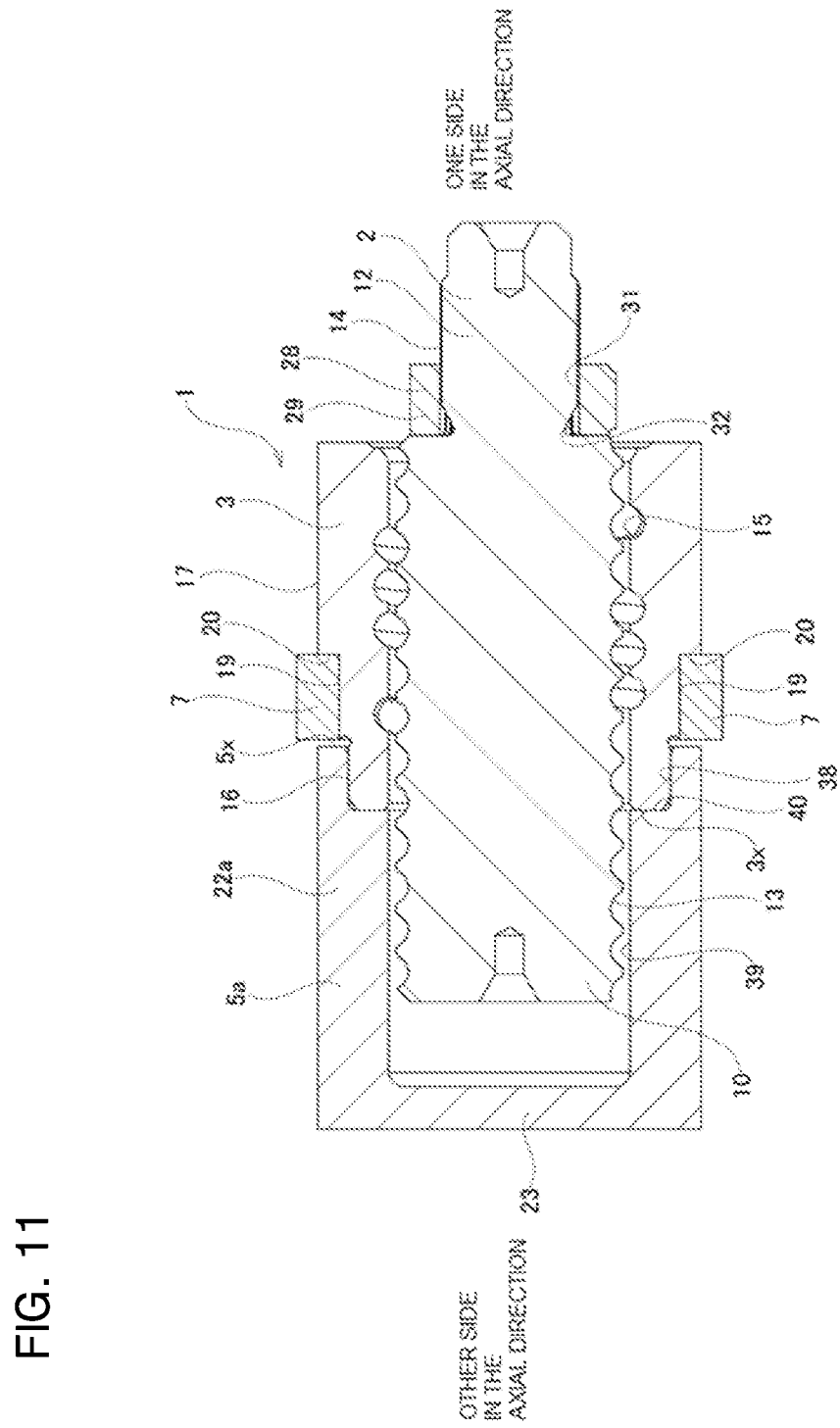
FIG. 11 is a view corresponding to FIG. 2 illustrating a ball screw device of a second example of an embodiment of the present invention with a housing thereof omitted.

FIG. 11 shows a second example of an embodiment of the present invention.

In this example, the inner-circumferential surface of the cylindrical portion 22a of the piston 5a is stepped. The cylindrical portion 22a has a large-diameter surface portion 38 having a cylindrical surface shape at an end portion on the one side in the axial direction of the inner-circumferential surface and a small-diameter surface portion 39, which has a cylindrical surface shape with an inner diameter smaller than that of the large-diameter surface portion 38, at a portion on the inner-circumferential surface that is shifted to the other side in the axial direction from the large-diameter surface portion 38. Furthermore, the cylindrical portion 22a has an annular surface 40 facing the one side in the axial direction between the large-diameter surface portion 38 and the small-diameter surface portion 39 on the inner-circumferential surface. The annular surface 40 is offset to the other side in the axial direction from the end surface 5x on the one side in the axial direction of the piston 5a. The annular surface 40 is configured by a flat surface existing on a virtual plane perpendicular to the center axis of the piston 5a.

In this example, the large-diameter surface portion 38 provided at the end portion on the one side in the axial direction of the cylindrical portion 22a is externally fitted and fixed to the small diameter portion 16 of the nut 3 by press fitting. In a state where the cylindrical portion 22a is externally fitted to the small diameter portion 16, the annular surface 40 provided on the inner-circumferential surface of the cylindrical portion 22a abuts against the end surface 3x on the other side in the axial direction of the nut 3 in the axial direction. A gap is provided over the entire circumference between the end surface 5x on the one side in the axial direction of the piston 5 and the stepped surface 18 (see FIG. 7).

With the ball screw device 1 of this example, the axial force can be transmitted through the abutting portion between the annular surface 40 and the end surface 3x on the other side in the axial direction of the nut 3. Therefore, the gap between the end surface 5x on the one side in the axial direction of the piston 5 and the end surface on the other side in the axial direction of the anti-rotation member 7 can be made larger than in the construction of the first example. Furthermore, since it is easy to secure the width in the radial direction of the abutting portion, it is possible to effectively prevent the piston 5a from tilting with respect to the nut 3. Other configurations and operational effects are the same as in the first example.

Third Example

Figure 12:
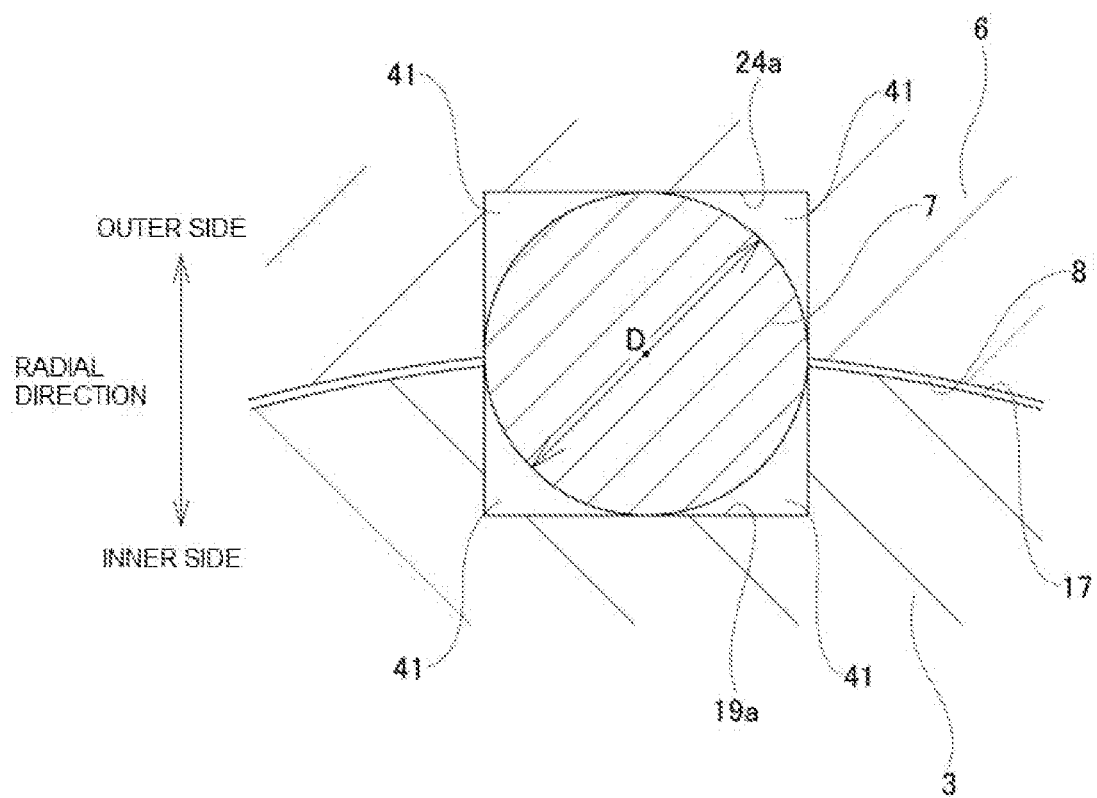
FIG. 12 is a view corresponding to FIG. 5 illustrating a ball screw device of a third example of an embodiment of the present invention.

FIG. 12 shows a third example of an embodiment of the present invention.

In this example, only the cross-sectional shapes of the retaining concave portion 19a provided on the outer-circumferential surface of the nut 3 and the guide concave groove 24a provided on the inner-circumferential surface of the cylinder hole 8 are made different from the construction of the first example.

Specifically, the cross-sectional shape of the retaining concave portions 19a with respect to the virtual plane perpendicular to the center axis of the nut 3 is rectangular, and the cross-sectional shape of the guide concave grooves 24a with respect to the virtual plane perpendicular to the center axis of the cylinder hole 8 is rectangular. That is, the retaining concave portion 19a and the guide concave groove 24a are respectively configured by a square groove. Therefore, the widths in the circumferential direction of the retaining concave portion 19a and the guide concave groove 24a are constant in the radial direction.

The retaining concave portion 19a and the guide concave groove 24a respectively have a groove depth approximately equal to half the diameter D of the anti-rotation members 7. The opening width in the circumferential direction of the retaining concave portion 19a on the outer-circumferential surface of the nut 3 and the opening width in the circumferential direction of the guide concave groove 24a on the inner-circumferential surface of the cylinder hole 8 are approximately the same as the diameter D of the anti-rotation members 7. In this example, although the groove depths and the opening widths of the retaining concave portion 19a and the guide concave groove 24a are made to be the same, they can be made different in a case of implementing the present invention.

According to this example, the retaining concave portion 19a and the guide concave groove 24a can be easily processed using a milling machine. Therefore, it is advantageous in reducing the manufacturing cost of the ball screw device 1. A gap 41 having a substantially triangular cross section can be respectively formed at corner portions of the retaining concave portion 19a and the guide concave groove 24a. As a result, a sufficient amount of grease can be retained in the gaps 41. Accordingly, the sliding resistance of the anti-rotation member 7 with respect to the guide concave groove 24a can be reduced. Since the cross-sectional shape of the guide concave groove 24a is rectangular, the guide concave groove 24a and the anti-rotation member 7 can be brought into line contact. Therefore, the slidability between the anti-rotation member 7 and the guide concave groove 24a can be improved. Other configurations and operational effects are the same as in the first example.

Fourth Example

Figure 13:
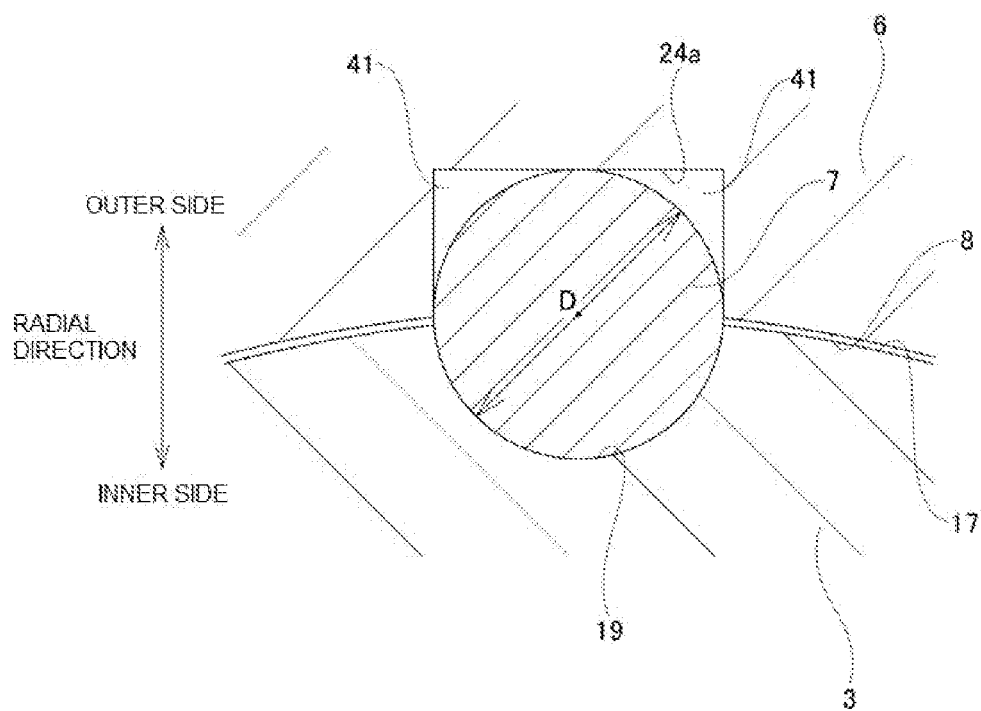
FIG. 13 is a view corresponding to FIG. 5 illustrating a ball screw device of a fourth example of an embodiment of the present invention.

FIG. 13 shows a fourth example of an embodiment of the present invention.

In this example, the cross-sectional shape of the retaining concave portion 19 provided on the outer-circumferential surface of the nut 3 is arc-shaped as in the construction of the first example, and the cross-sectional shape of the guide concave groove 24a provided on the inner-circumferential surface of the cylinder hole 8 is rectangular as in the construction of the third example.

According to this example, since the cross-sectional shape of the retaining concave portion 19 is arc-shaped, the contact area between the inner surface of retaining concave portion 19 and the anti-rotation member 7 can be made larger than in the construction of the third example. As a result, the anti-rotation member 7 can be restrained from relatively moving in the axial direction between the end surface 5x on the one side in the axial direction of the piston 5 and the closed surface 20 of the retaining concave portion 19. Accordingly, it is possible to suppress the generation of abnormal noise due to the collision between the end surface in the axial direction of the anti-rotation member 7, and the end surface 5x on the one side in the axial direction of the piston 5 or the closed surface 20 of the retaining concave portion 19. Other configurations and operational effects are the same as in the first and the third examples.

Fifth Example

Figure 14:
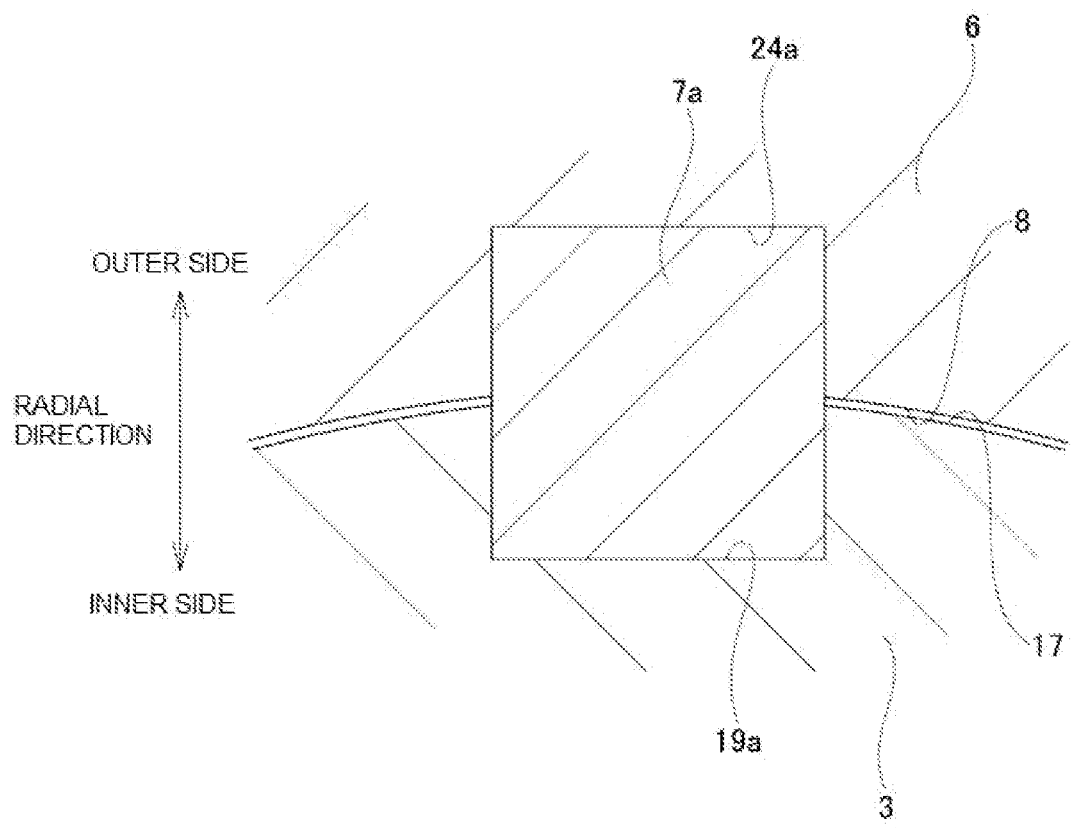
FIG. 14 is a view corresponding to FIG. 5 illustrating a ball screw device of a fifth example of an embodiment of the present invention.

A fifth example of an embodiment of the present invention will be described with reference to FIG. 14.

In this example, only the shape of the anti-rotation member 7a is different from the construction of the third example.

Specifically, the anti-rotation member 7a is configured in a quadrangular prismatic shape. The radially inner portion of the anti-rotation member 7a is arranged inside the retaining concave portion 19a having a rectangular cross-sectional shape with almost no gap, and the radially outer portion of the anti-rotation member 7 is arranged inside the guide concave groove 24a having a rectangular cross-sectional shape with almost no gap. That is, the inside surface in the radial direction of the anti-rotation member 7a is brought into surface contact with the bottom surface in the radial direction of the retaining concave portion 19a, and the outside surface in the radial direction is brought into surface contact with the bottom surface in the radial direction of the guide concave groove 24a. Both side surfaces in the circumferential direction of the anti-rotation member 7a are in surface contact with the side surfaces in the circumferential direction of the retaining concave portion 19a and the guide concave groove 24a.

According to this example, the anti-rotation member 7a can be manufactured at low cost. Therefore, it is advantageous in reducing the manufacturing cost of the ball screw device 1. Moreover, it is possible to suppress rattling of the anti-rotation member 7a inside the retaining concave portion 19a and the guide concave groove 17a. Accordingly, it is possible to prevent the nut 3 from rattling in the circumferential direction with respect to the housing 6. Other configurations and operational effects are the same as in the first example.

Sixth Example

Figure 15:
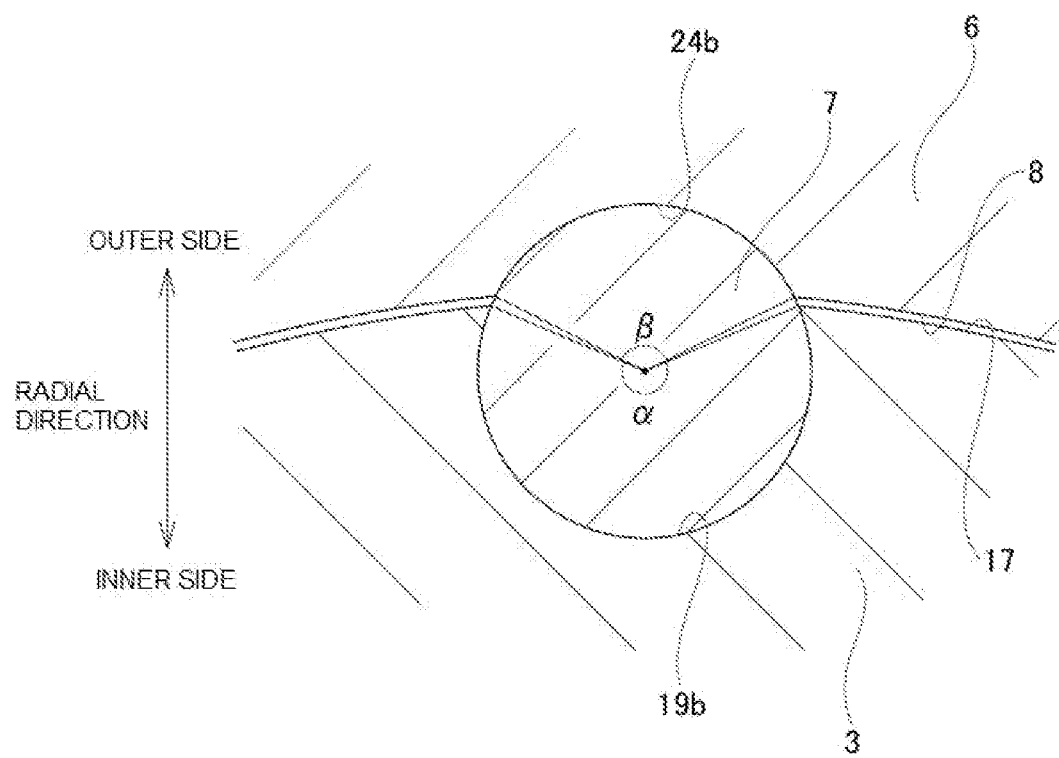
FIG. 15 is a view corresponding to FIG. 5 illustrating a ball screw device of a sixth example of an embodiment of the present invention.

FIG. 15 shows a sixth example of an embodiment of the present invention.

In this example, only the cross-sectional shapes of the retaining concave portion 19b provided on the outer-circumferential surface of the nut 3 and the guide concave groove 24b provided on the inner-circumferential surface of the cylinder hole 8 are different from the construction of the first example.

In this example, the cross-sectional shape of the retaining concave portion 19b with respect to the virtual plane perpendicular to the center axis is arc-shaped with a center angle α greater than 180 degrees (in the illustrated example, the center angle is approximately 230 degrees). As a result, the width in the circumferential direction of the retaining concave portion 19b increases as going from the inside section in the radial direction toward the middle section in the radial direction, and then decreases as going from the middle section in the radial direction toward the outside section in the radial direction. The opening width of the retaining concave portion 19b in the circumferential direction on the outer-circumferential surface of the nut 3 is sufficiently smaller than the diameter D of the anti-rotation member 7 (see FIG. 5).

On the other hand, the cross-sectional shape of the guide concave groove 24 with respect to the virtual plane perpendicular to the center axis of the cylinder hole 8 is arc-shaped with a center angle β smaller than 180 degrees (in the illustrated example, the center angle is approximately 130 degrees).

According to this example, in a state where the radially inner portion of the anti-rotation member 7 is arranged inside the retaining concave portion 19b, that is, in a state where it is inserted in the axial direction, it is possible to prevent the anti-rotation member 7 from coming off from the retaining concave portion 19b toward outside in the radial direction. Accordingly, the workability of assembling the ball screw device 1 can be improved. Other configurations and operational effects are the same as in the first example.

Seventh Example

Figure 16:
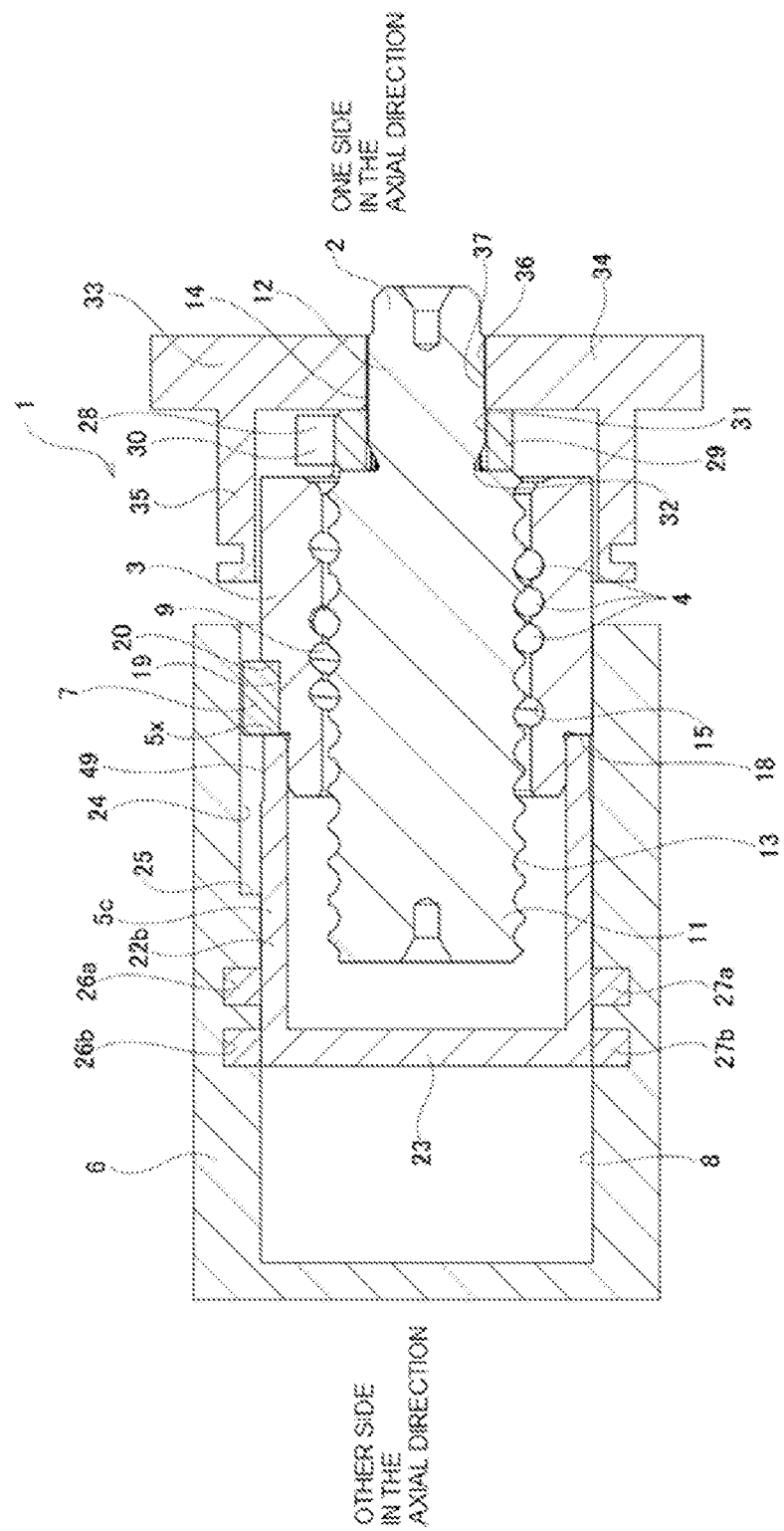
FIG. 16 is a view corresponding to FIG. 2 illustrating a ball screw device of a seventh example of an embodiment of the present invention.

FIG. 16 shows a seventh example of an embodiment of the present invention.

In this example, only the shape of the outer-circumferential surface of the cylindrical portion 22b of the piston 5c is different from the construction of the first example.

In this example, the cylindrical portion 22c of the piston 5c has a small-diameter stepped portion 49, which has an outer dimeter slightly smaller than an outer diameter of a portion adjacent to the other side in the axial direction, at an end portion of the outer-circumferential surface on the side close to the nut 3, that is, an end portion on the one side in the axial direction. Accordingly, the outer diameter of the piston 5c corresponds to the outer diameter of the portion of the cylindrical portion 22c that is shifted to the other side in the axial direction from the small-diameter stepped portion 49, and the outer diameter of the portion is approximately the same as the outer diameter of the nut 3. The small-diameter stepped portion 49 has a length in the axial direction that is equal to or larger than the length in the axial direction of the small diameter portion 16 of the nut 3.

In this example, since the small-diameter stepped portion 49 is provided at the end portion on the one side in the axial direction on the outer-circumferential surface of the cylindrical portion 22c of the piston 5c, even when the diameter of the small-diameter stepped portion 49 expands as a result of externally fitting and fixing the end portion on the one side in the axial direction of the cylindrical portion 22c to the small diameter portion 16 of the nut 3 by press fitting, it is possible to effectively prevent the small-diameter stepped portion 49 whose roundness has decreased due to the diameter expansion from coming into contact with the inner-circumferential surface of the cylinder hole 8. The extent to which the outer diameter of the small-diameter stepped portion 49 is smaller than the outer diameter of the portion adjacent to the other side in the axial direction is not particularly limited as long as the small-diameter stepped portion 49 can be prevented from coming into contact with the inner-circumferential surface of the cylinder hole 8 and the fitting strength between the piston 5c and the nut 3 can be secured. Other configurations and operational effects are the same as in the first example.

Eighth Example

Figure 17:
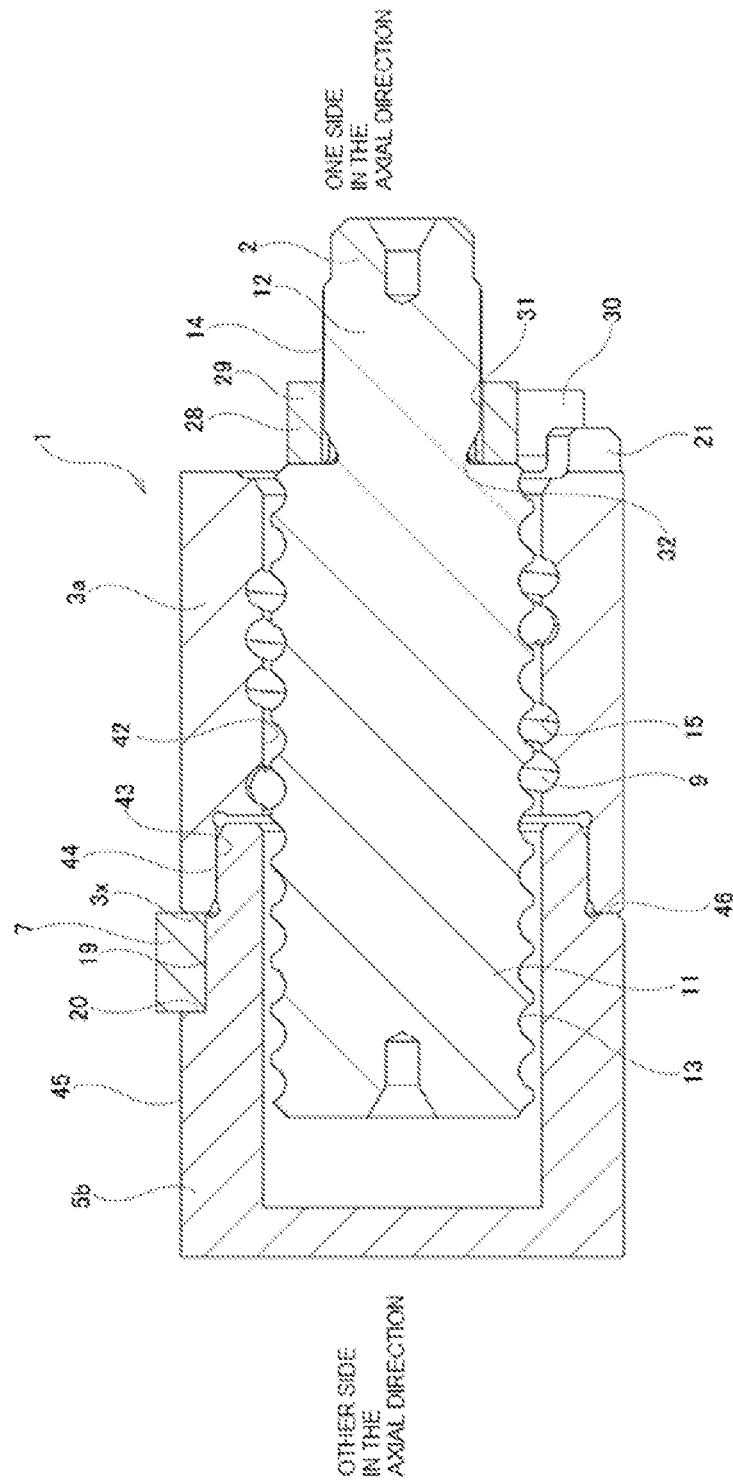
FIG. 17 is a view corresponding to FIG. 11 illustrating a ball screw device of an eighth example of an embodiment of the present invention.

FIG. 17 shows an eighth example of an embodiment of the present invention.

In this example, unlike the first to sixth examples, the retaining concave portion 19 is provided not on the outer-circumferential surface of the nut 3a, but on the outer-circumferential surface of the piston 5b. That is, in this example, the piston 5b corresponds to the first member, and the nut 3a corresponds to the second member.

The nut 3a has an outer-circumferential surface having a cylindrical surface shape whose outer diameter does not change over the axial direction. In this example, the inner-circumferential surface of the nut 3a is configured by a stepped cylindrical surface. Specifically, the nut 3a has a small-diameter surface portion 42 in which the nut-side ball thread groove 15 is formed on the inner-circumferential surface, and a large-diameter surface portion 43 having a cylindrical surface shape, which has an inner diameter larger than that of the small-diameter surface portion 42 and is provided in a portion shifted to the other side in the axial direction from the small-diameter surface portion 42.

The outer-circumferential surface of the piston 5b is configured by a stepped cylindrical surface. The piston 5b has a small diameter portion 44 having a cylindrical surface shape at an end portion on the one side in the axial direction on the outer-circumferential surface, and has a large diameter portion 45 having a cylindrical surface shape in a range from the middle section in the axial direction on the outer-circumferential surface to the other side portion in the axial direction. The piston 5b has an annular stepped surface 46 facing the one side in the axial direction between the small diameter portion 44 and the large diameter portion 45 of the outer-circumferential surface. The stepped surface 46 is a flat surface existing on the virtual plane perpendicular to the center axis of the piston 5b. The outer diameter of the large diameter portion 45 is the same as the outer diameter of the nut 3a.

In this example, in order to prevent rotation of the nut 3a, which is a linear motion element, the retaining concave portion 19 for retaining the anti-rotation member 7 is provided on the outer-circumferential surface of the piston 5b. The retaining concave portion 19 is provided respectively at portions in the circumferential direction (for example, two locations) on the outer-circumferential surface of the piston 5b. The retaining concave portion 19 is arranged on the one side in the axial direction of the large diameter portion 45 on the outer-circumferential surface of the piston 5b.

The retaining concave portion 19 is configured by a concave groove extending in the axial direction. The retaining concave portion 19 has a closed surface 20 facing the one side in the axial direction at an end portion on the other side in the axial direction. An end portion on the one side in the axial direction of the retaining concave portion 19 is open to the stepped surface 46. Therefore, the retaining concave portion 19 is open to the outer-circumferential surface and the stepped surface 46 of the piston 5b. The center axis of the retaining concave portion 19 is arranged parallel to the center axis of the piston 5b. The dimension in the axial direction from the stepped surface 46 to the closed surface 20 is slightly larger than the dimension in the axial direction of the anti-rotation member 7. The closed surface 20 is a flat surface that exists on the virtual plane perpendicular to the center axis of the piston 5b, and has a partially circular shape (substantially semi-circular shape) when viewed in the axial direction.

The retaining concave portion 19 has a cross-sectional shape that can be engaged with the radially inner portion of the anti-rotation member 7 in the circumferential direction. In this example, since the anti-rotation member 7 is configured in a columnar shape, the cross-sectional shape of the retaining concave portion 19 with respect to the virtual plane perpendicular to the center axis of the piston 5b is arc-shaped. The diameter of the inscribed circle passing through the portion of the retaining concave portion 19 where the depth in the radial direction is the largest is equal to or larger than the outer diameter of the small diameter portion 44.

In this example, the small diameter portion 44 provided at the end portion on the one side in the axial direction on the outer-circumferential surface of the piston 5b is fitted to the large-diameter surface portion 43 provided at the end portion on the other side in the axial direction of the inner-circumferential surface of the nut 3a by, for example, press fitting so as not to be able to relatively rotate.

In this example, the anti-rotation member 7 is held in the radial direction between the retaining concave portion 19 provided on the outer-circumferential surface of the piston 5b and the guide concave grooves 24 (see FIG. 2) provided on the inner-circumferential surface of the cylinder hole 8 (not illustrated in FIG. 17).

The radially inner portion of the anti-rotation member 7 (lower portion in FIG. 17) is arranged inside the retaining concave portion 19. The radially inner portion of the anti-rotation member 7 is held in the axial direction between the closed surface 20 of the retaining concave portion 19 and the end surface 3x on the other side in the axial direction of the nut 3a. In other words, the end surface on the other side in the axial direction of the anti-rotation member 7 faces the closed surface 20 in the axial direction, and the end surface on the one side in the axial direction of the anti-rotation member 7 faces the end surface 3x on the other side in the axial direction of the nut 3a. Therefore, the anti-rotation member 7 is prevented from coming off in the axial direction by the closed surface 20 and the end surface 3x on the other side in the axial direction of the nut 3a. Accordingly, the radially inner portion of the anti-rotation member 7 is arranged inside the retaining concave portions 19 so as not to be able to move in the axial direction.

In this example, the dimension in the axial direction of the anti-rotation member 7 is set slightly smaller than the dimension in the axial direction from the stepped surface 46 of the piston 5b to the closed surface 20 of the retaining concave portion 19. Therefore, in a state where the piston 5b is externally fitted and fixed to the nut 3a, the dimension in the axial direction of the anti-rotation member 7 is slightly smaller than the distance in the axial direction from the end surface 3x on the other side in the axial direction of the nut 3a that abuts against the stepped surface 46 to the closed surface 20. Accordingly, a gap is formed between the end surface on the other side in the axial direction of the anti-rotation member 7 and the closed surface 20, and/or between the end surface on the one side in the axial direction of the anti-rotation member 7 and the end surface 3x on the other side in the axial direction of the nut 3a. In other words, the end surfaces on both sides in the axial direction of the anti-rotation member 7 do not simultaneously contact the closed surface 20 and the end surface 3x on the other side in the axial direction of the nut 3a, which face each other in the axial direction.

The radially outer portion of the anti-rotation member 7 (upper side portion in FIG. 17) is arranged inside the guide concave groove 24 so as to be able to slide in the axial direction.

According to this example, similar to the ball screw device 1 of the first example, compared to the conventional structure described in JP 2007-303515A, anti-rotation of the nut 3a can be achieved with a small number of parts, and the manufacturing cost can be reduced.

In this example, since the retaining concave portion 19 is formed on the outer-circumferential surface of the piston 5b and any retaining concave portion is not required to be formed on the outer-circumferential surface of the nut 3a, the outer diameter of the nut 3a (thickness) is not required to be large in order to secure the strength of the nut 3a. Therefore, the ball screw device 1 can be more compact. Moreover, it is not necessary to consider the formation position of the retaining concave portion 19 in relation to the circulation groove 10 (see FIG. 7) provided on the inner-circumferential surface of the nut 3a. Accordingly, since the degree of freedom in designing the ball screw device 1 can be improved, the manufacturing cost of the ball screw device 1 can be reduced. Other configurations and operational effects are the same as in the first example.

Although an embodiment of the present invention has been descried above, the present invention is not limited to this, and it can be appropriately modified as long as it does not deviate from the scope of the invention. Moreover, the structures of the first to eighth examples of an embodiment of the present invention can be appropriately combined and implemented as long as no contradiction occurs.

In the first to eighth examples of an embodiment of the present invention, although the case where the anti-rotation member has a columnar shape or a prismatic shape has been described, in a case of implementing the present invention, the anti-rotation member may have a spherical shape or other shapes.

In the first to eighth examples of an embodiment of the present invention, although the case where the cross-sectional shapes of the retaining concave portion and the guide concave groove are arc-shaped and rectangular, in a case of implementing the present invention, the cross-sectional shapes of the retaining concave portion and the guide concave groove can be appropriately changed. For example, the cross-sectional shape of the retaining concave portion can be arc-shaped and the cross-sectional shape of the guide concave groove can be rectangular, or conversely, the cross-sectional shape of the retaining concave portion can be rectangular and the cross-sectional shape of the guide concave groove can be arc-shaped.

In the first to eighth examples of an embodiment of the present invention, although the case where two retaining concave portions and two guide concave grooves are provided has been described, in a case of implementing the present invention, it is also possible to adopt a structure in which one retaining concave portion and one guide concave groove are provided, or a structure in which three or more retaining concave portions and the guide concave grooves are provided. When a plurality of retaining concave portions and guide concave grooves are provided, the retaining concave portions and the guide concave grooves can be arranged so as to be evenly spaced in the circumferential direction, or so as to be unevenly spaced in the circumferential direction.

In the first to eighth examples of an embodiment of the present invention, although the case where a piston is used as a fitting cylinder has been described, in a case of implementing the present invention, not only the piston but other members having other functions can also be used. As for the means for fixing the fitting cylinder to the nut as well, it is not limited to press fitting, and other means such as screwing, crimping, and welding can be adopted.

REFERENCE SIGNS LIST

1 Ball screw device
2 Screw shaft
3, 3a Nut
3x End surface
4 Balls
5, 5a, 5b, 5c Piston
5x End surface
6 Housing
7, 7a Anti-rotation member
8 Cylinder hole
9 Load path
10 Circulation groove
11 Screw portion
12 Fitting shaft portion
13 Shaft-side ball thread groove
14 Male spline teeth
15 Nut-side ball thread groove
16 Small diameter portion
17 Large diameter portion
18 Stepped surface
19, 19a, 19b Retaining concave portion
20 Closed surface
21 First engaging portion
22, 22a, 22b Cylindrical portion
23 Bottom plate portion
24, 24a, 24b Guide concave groove
25 Stepped portion
26a, 26b Seal concave groove
27a, 27b O-ring
28 Stopper
29 Boss portion
30 Second engaging portion
31 Engaging hole
32 Female spline teeth
33 Driving member
34 Base plate portion
35 Tubular portion
36 Mounting hole
37 Female spline teeth
38 Large-diameter surface portion
39 Small-diameter surface portion
40 Annular surface
41 Gap
42 Small-diameter surface portion
43 Large-diameter surface portion
44 Small diameter portion
45 Large diameter portion
46 Stepped surface
47 Chamfer portions
48 Continuous portions
49 Small-diameter stepped portion
100 Ball screw device
101 Screw shaft 102 Nut
103 Ball
104 Fitting cylinder
105 Housing
106 Shaft-side ball thread groove
107 Nut-side ball thread groove
108 Load path
109 Key groove
110 Insertion hole
111 Key
112 Fitting groove

The invention claimed is:

1. A ball screw device comprising:
a screw shaft including a shaft-side ball thread groove having a spiral shape on an outer-circumferential surface thereof, the screw shaft rotating during use,
a nut including a nut-side ball thread groove having a spiral shape on an inner-circumferential surface thereof, the nut moving linearly during use,
balls arranged between the shaft-side ball thread groove and the nut-side ball thread groove,
a fitting cylinder fitted and fixed to the nut and linearly moving with the nut,
a housing having an insertion hole through which the nut can be inserted in an axial direction, and
an anti-rotation member preventing the nut from rotating relative to the housing,
a first member, which is one of the nut and the fitting cylinder, having a retaining concave portion on an outer-circumferential surface thereof, the retaining concave portion capable of engaging with a radially inner portion of the anti-rotation member in a circumferential direction and including a closed surface facing the axial direction,
the insertion hole having a guide concave groove on an inner-circumferential surface thereof, the guide concave groove capable of engaging with a radially outer portion of the anti-rotation member in the circumferential direction and extending in the axial direction, and
the radially inner portion of the anti-rotation member arranged inside the retaining concave portion with the radially inner portion held between the closed surface and an end surface in the axial direction of a second member, which is the other of the nut and the fitting cylinder, and the radially outer portion of the anti-rotation member arranged inside the guide concave groove so as to slide in the axial direction.

2. The ball screw device according to claim 1, wherein a dimension in the axial direction of the anti-rotation member is smaller than a distance in the axial direction between the closed surface and the end surfaces in the axial direction of the second member.

3. The ball screw device according to claim 1, wherein the first member has a small diameter portion, a large diameter portion having an outer diameter larger than an outer diameter of the small diameter portion, and a stepped surface facing the axial direction and arranged between the small diameter portion and the large diameter portion, on an outer-circumferential surface thereof,
the second member is externally fitted and fixed to the small diameter portion, and
the retaining concave portion is formed in the large diameter portion and is open to the stepped surface.

4. The ball screw device according to claim 3, wherein the end surface in the axial direction of the second member is abutted against the stepped surface in the axial direction.

5. The ball screw device according to claim 3, wherein the second member has an annular surface facing the axial direction at a position offset in the axial direction from the end surface in the axial direction, and
the annular surface is abutted against an end surface in the axial direction of the first member.

6. The ball screw device according to claim 1, wherein the first member is configured by the nut.

7. The ball screw device according to claim 6, wherein the nut has a circulation groove on the inner-circumferential surface, and
the retaining concave portion is arranged in a position shifted in the circumferential direction from the circulation groove.

8. The ball screw device according to claim 7, wherein the nut has the circulation groove respectively arranged at portions evenly spaced in the circumferential direction, and
the retaining concave portion is respectively arranged so as to be shifted by the same angle on opposite sides in the circumferential direction with respect to two circulation grooves that are close to each other in the circumferential direction of the circulation grooves arranged at the portions.

9. The ball screw device according to claim 6, wherein a circulation component is provided, the circulation component having a circulation groove and fixed to the nut, and
the retaining concave portion is arranged in a position shifted in the circumferential direction from the circulation component.

10. The ball screw device according to claim 9, wherein the circulation component is provided respectively at portions evenly spaced in the circumferential direction, and
the retaining concave portion is respectively arranged so as to be shifted by the same angle on opposite sides in the circumferential direction with respect to two circulation components that are close to each other in the circumferential direction of the circulation components provided at the portions.

11. The ball screw device according to claim 1, wherein the retaining concave portion is provided on an outer-circumferential surface of the fitting cylinder.

12. The ball screw device according to claim 1, wherein the fitting cylinder has an outer diameter equal to an outer diameter of the nut.

13. The ball screw device according to claim 1, wherein the anti-rotation member has a columnar shape.

14. The ball screw device according to claim 13, wherein the retaining concave portion has a cross-sectional shape with respect to a virtual plane perpendicular to a center axis of the nut, the cross-section shape having an arc-shape with a center angle greater than 180 degrees.

15. The ball screw device according to claim 1, wherein the anti-rotation member has a prismatic shape.

16. The ball screw device according to claim 1, wherein the insertion hole is configured by a cylinder hole, and the fitting cylinder is configured by a piston.

17. The ball screw device according to claim 1, wherein the second member has a small-diameter stepped portion at an end portion on a side closer to the first member on an outer-circumferential surface thereof.

* * * * *